US008838108B2

(12) United States Patent
Swaminathan et al.

(10) Patent No.: US 8,838,108 B2
(45) Date of Patent: Sep. 16, 2014

(54) TECHNIQUES TO OPTIMIZE THE INTERACTION BETWEEN C2K IDLE HANDOFF AND C2K-LTE RESELECTION

(75) Inventors: Arvind Swaminathan, San Diego, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 13/220,456

(22) Filed: Aug. 29, 2011

(65) Prior Publication Data

US 2012/0052864 A1 Mar. 1, 2012

Related U.S. Application Data

(60) Provisional application No. 61/378,589, filed on Aug. 31, 2010.

(51) Int. Cl.
*H04W 36/00* (2009.01)
*H04W 48/16* (2009.01)
*H04W 36/14* (2009.01)
*H04W 48/18* (2009.01)

(52) U.S. Cl.
CPC .......... *H04W 36/0061* (2013.01); *H04W 48/16* (2013.01); *H04W 36/14* (2013.01); *H04W 48/18* (2013.01)
USPC .......................................... 455/436; 370/338

(58) Field of Classification Search
CPC ..... H04W 36/00; H04W 36/04; H04W 36/16; H04W 36/24
USPC .......................................... 455/436; 370/338
See application file for complete search history.

(56) References Cited

U.S. PATENT DOCUMENTS

| | | | |
|---|---|---|---|
| 2008/0220784 A1* | 9/2008 | Somasundaram et al. ..... | 455/437 |
| 2010/0093349 A1 | 4/2010 | Gandhi et al. | |
| 2010/0128608 A1 | 5/2010 | Zou et al. | |
| 2010/0184429 A1* | 7/2010 | Tod et al. ...................... | 455/434 |

(Continued)

FOREIGN PATENT DOCUMENTS

| | | |
|---|---|---|
| EP | 2211576 A1 | 7/2010 |
| JP | 2008118404 A | 5/2008 |
| JP | 2008187544 A | 8/2008 |
| JP | 2010035152 A | 2/2010 |

OTHER PUBLICATIONS

Zou, et al., "Enhancement for RSRQ Based HRPD to LTE Idle Handoff," 3GPP2 TSG-C WG2, 2007, pp. 1-12.

(Continued)

*Primary Examiner* — Marcos Batista
(74) *Attorney, Agent, or Firm* — Arent Fox LLP

(57) ABSTRACT

A method, an apparatus, and a computer program product for wireless communication are provided. The apparatus initiates a process for reselection from a first network (e.g., C2K) to a second network (e.g., LTE) by performing a measurement on a frequency indicated in a neighbor list received from a first cell in the first network. The neighbor list includes information indicating at least one frequency associated with the second network. The apparatus creates a state (e.g., starts an EUTRAReselect timer) associated with the frequency based on the measurement. The apparatus moves (e.g., performs an idle HO) from the first cell to a second cell in the first network. The apparatus determines whether to maintain the state upon the move from the first cell to the second cell.

56 Claims, 28 Drawing Sheets

(56) References Cited

U.S. PATENT DOCUMENTS

| | | |
|---|---|---|
| 2011/0014919 A1 | 1/2011 | Otte et al. |
| 2011/0069675 A1 | 3/2011 | Tang et al. |
| 2011/0090870 A1 | 4/2011 | Ronneke et al. |

OTHER PUBLICATIONS

International Searching Authority, PCT International Search Report, Nov. 7, 2011, 16 pages, European Patent Office, The Netherlands.

3GPP, 3rd Generation Partnership Project; Technical Specification Group Radio Access Network; Evolved Universal Terrestrial Radio Access (E-UTRA); User Equipment (UE) procedures in idle mode (Release 9), 60 pages, vol. 9.3.0, France, Jun. 2010.

3GPP, 3rd Generation Partnership Project; Technical Specification Group Radio Access Network; Evolved Universal Terrestrial Radio Access (E-UTRA); Radio Resource Control (RRC); Protocol specificaction,(Release 9), 250 pages, vol. 9.3.0, France, Jun. 2010.

\* cited by examiner

TECHNIQUES TO OPTIMIZE THE INTERACTION BETWEEN C2K IDLE HANDOFF AND C2K-LTE RESELECTION

CROSS-REFERENCE TO RELATED APPLICATION(S)

This application claims the benefit of U.S. Provisional Application Ser. No. 61/378,589, entitled "Techniques to Optimize the Interaction Between C2K Idle Handoff and C2K-LTE Reselection" and filed on Aug. 31, 2010, which is expressly incorporated by reference herein in its entirety.

BACKGROUND

1. Field

The present disclosure relates generally to communication systems, and more particularly, to techniques for optimizing interaction between CDMA2000 (C2K) idle handoff (HO) and C2K/Long Term Evolution (LTE) reselection.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

When a user equipment (UE) is connected to a C2K network, the UE may start a process for reselecting to an LTE network. When the UE performs an idle HO from a first cell to a second cell in the C2K network during the process for reselection, methods are needed for handling a state of the process for reselection.

SUMMARY

In an aspect of the disclosure, a method, a computer program product, and an apparatus for wireless communication are provided. The apparatus initiates a process for reselection from a first network (e.g., C2K) to a second network (e.g., LTE) by performing a measurement on a frequency indicated in a neighbor list received from a first cell in the first network. The neighbor list includes information indicating at least one frequency associated with the second network. The apparatus creates a state associated with the frequency based on the measurement. The apparatus moves from the first cell to a second cell in the first network. The apparatus determines whether to maintain the state upon the move from the first cell to the second cell.

DETAILED DESCRIPTION

Figure 1:
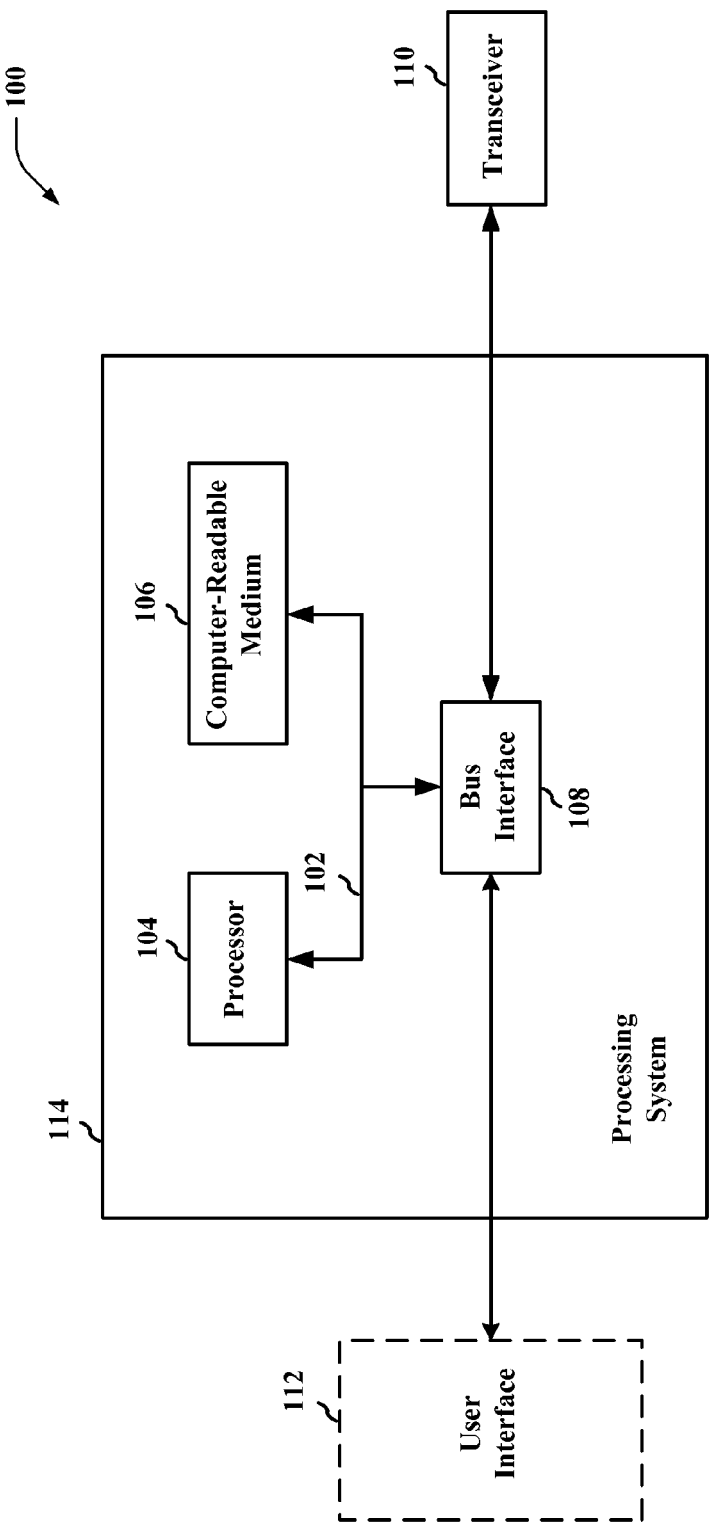
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
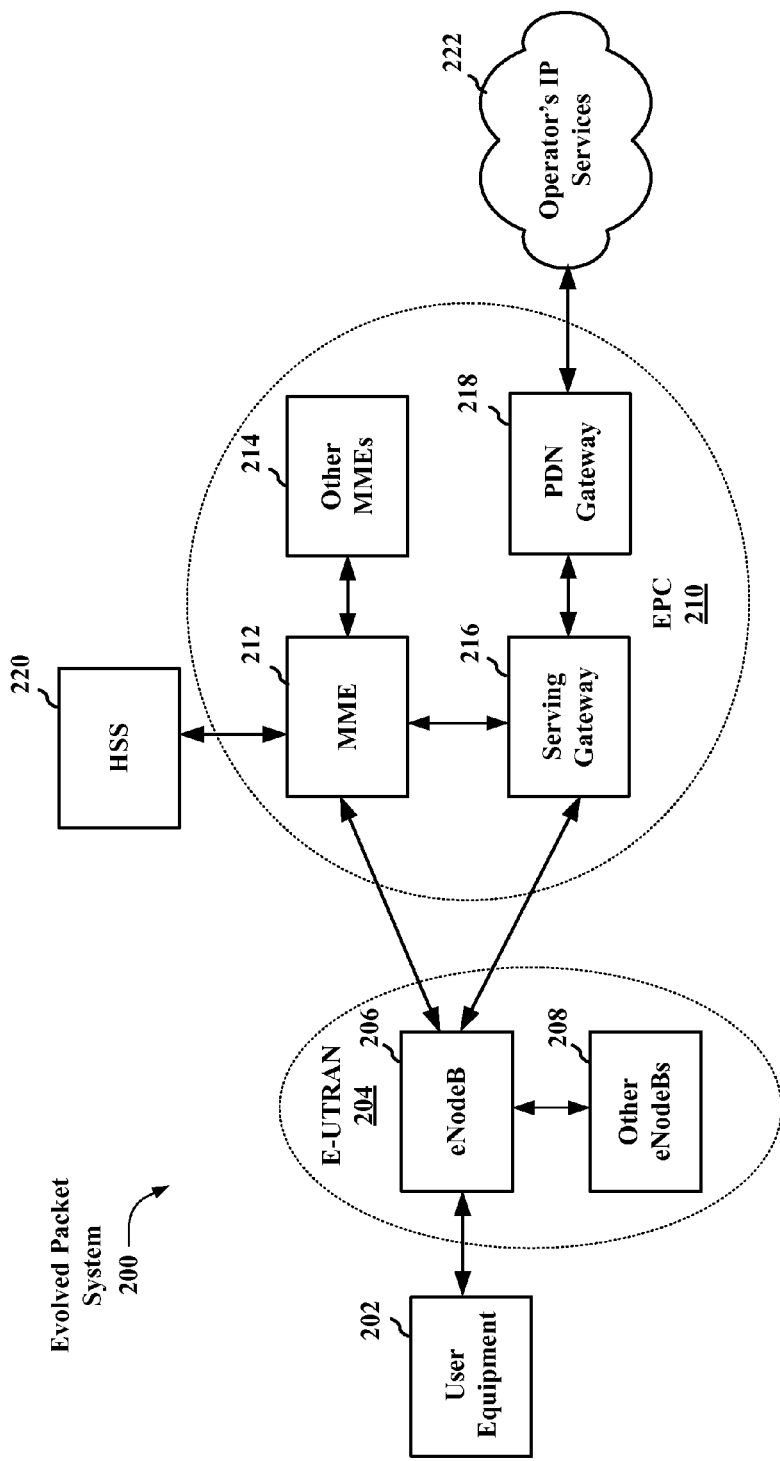
FIG. 2 is a diagram illustrating an example of a network architecture.

FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more UE 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (e.g., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 may include the Internet, the Intranet, an IP Multimedia Subsystem (IMS), and a PS Streaming Service (PSS).

Figure 3:
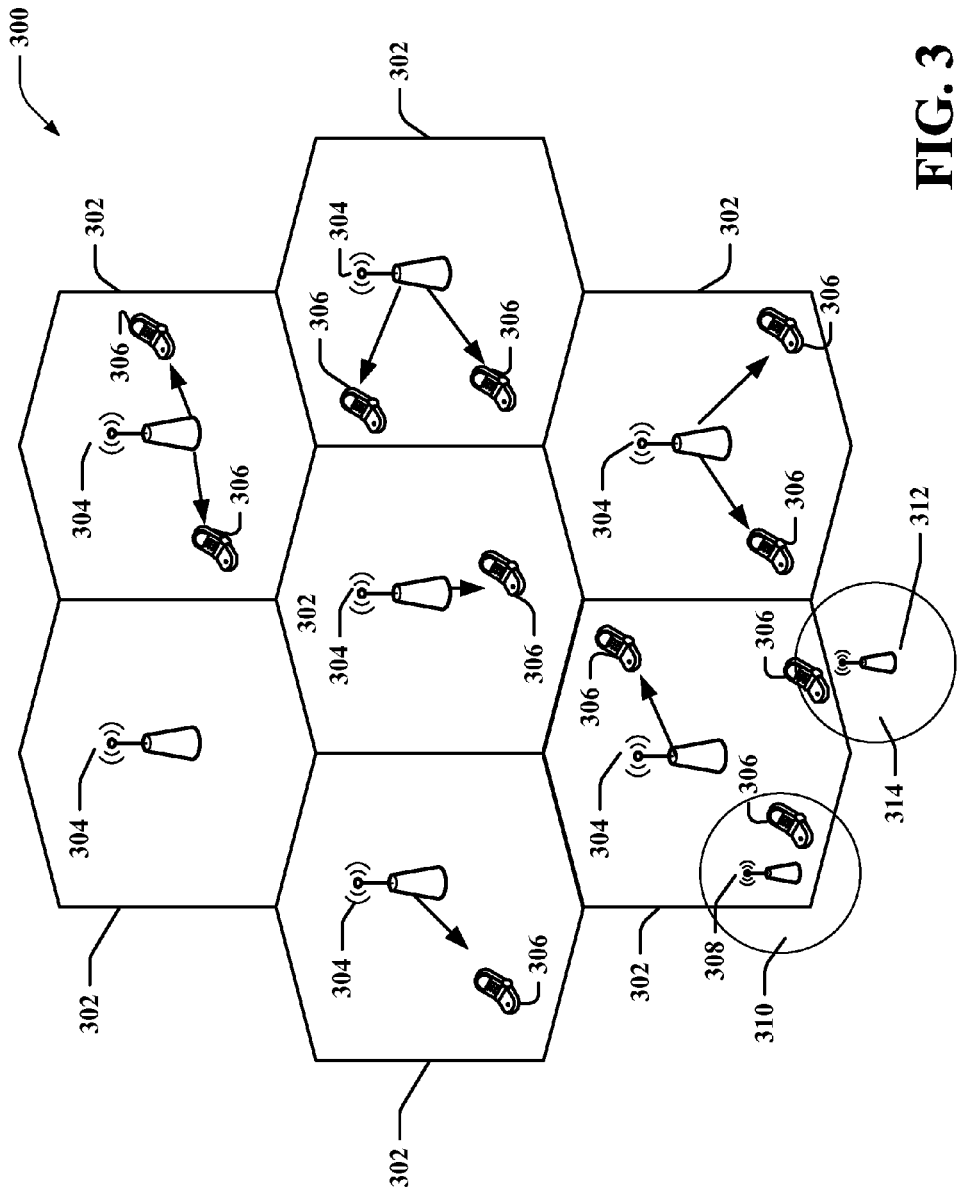
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 4:
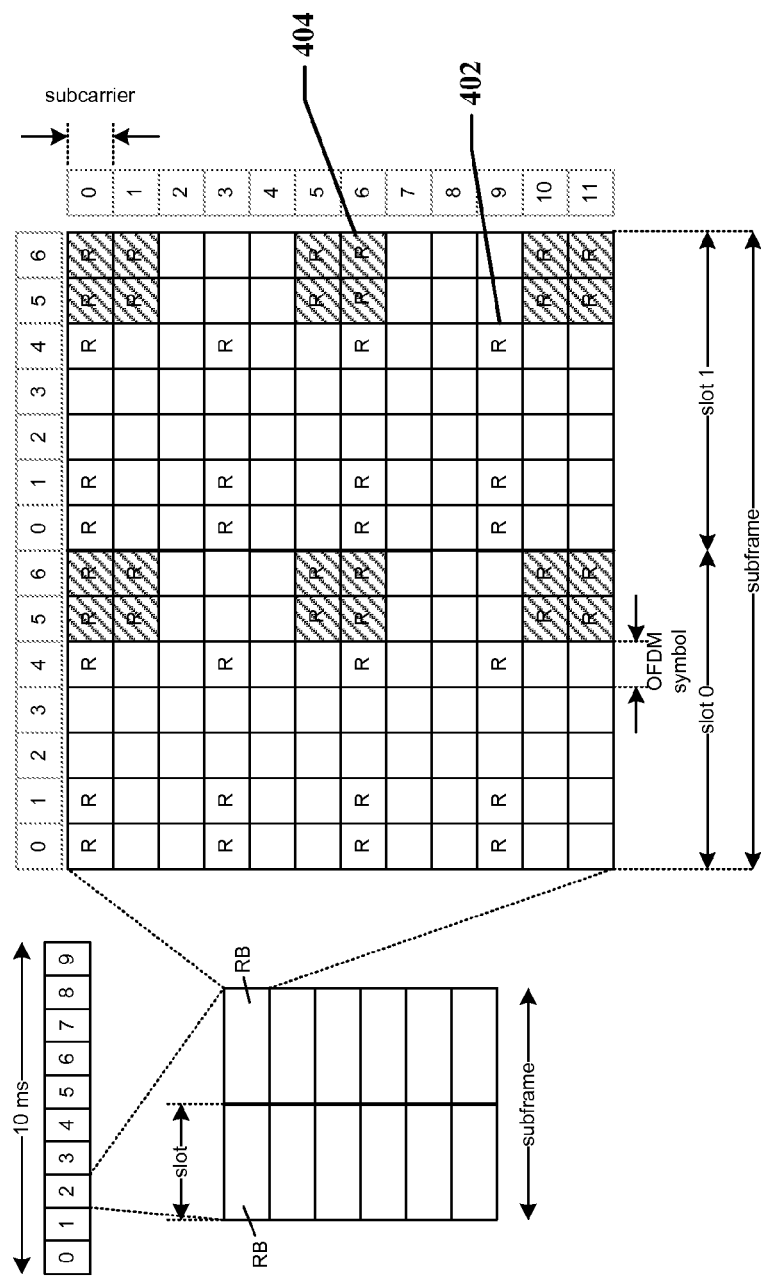
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
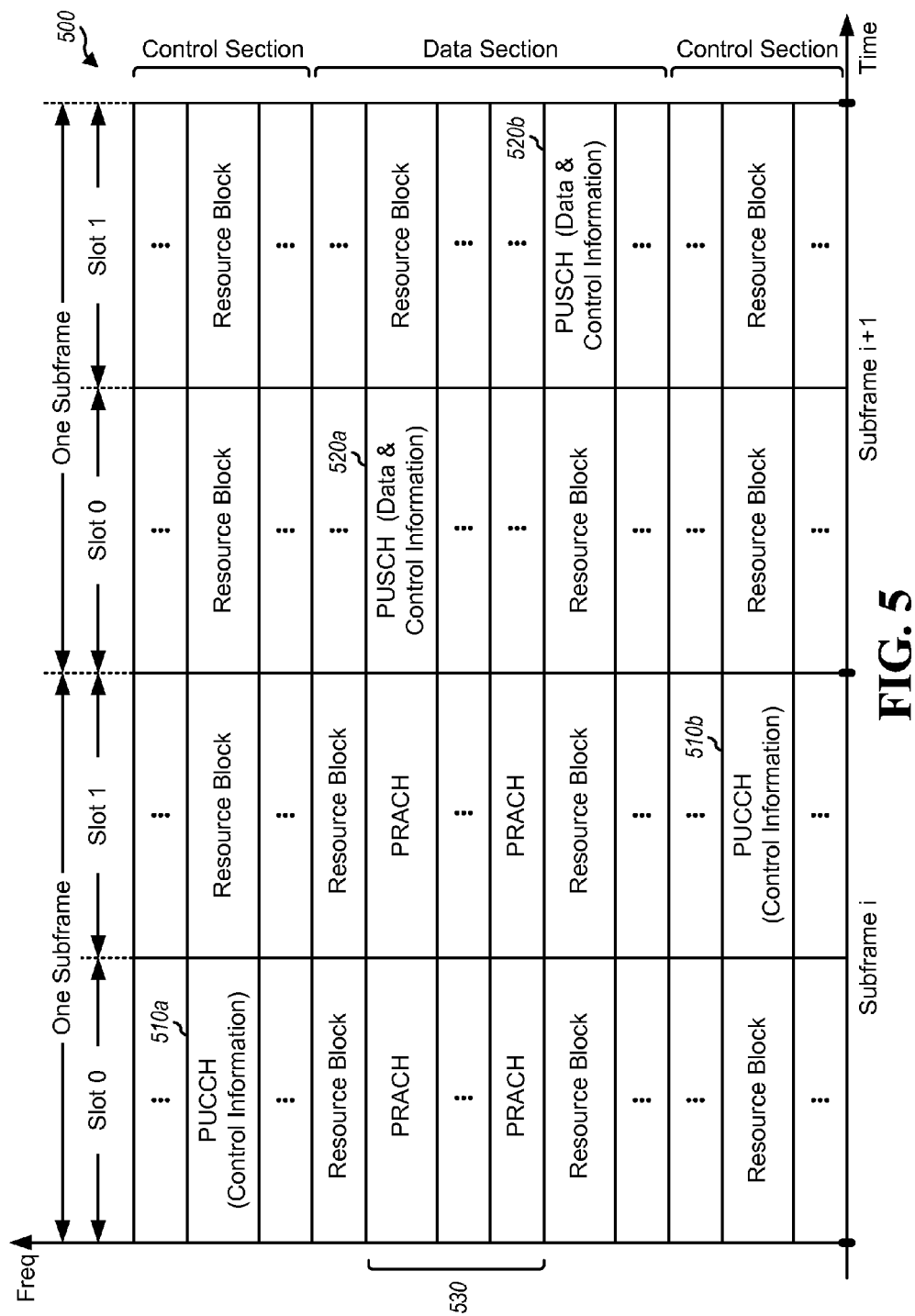
FIG. 5 shows an exemplary format for the UL in LTE.

An example of a UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. The PRACH 530 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 6:
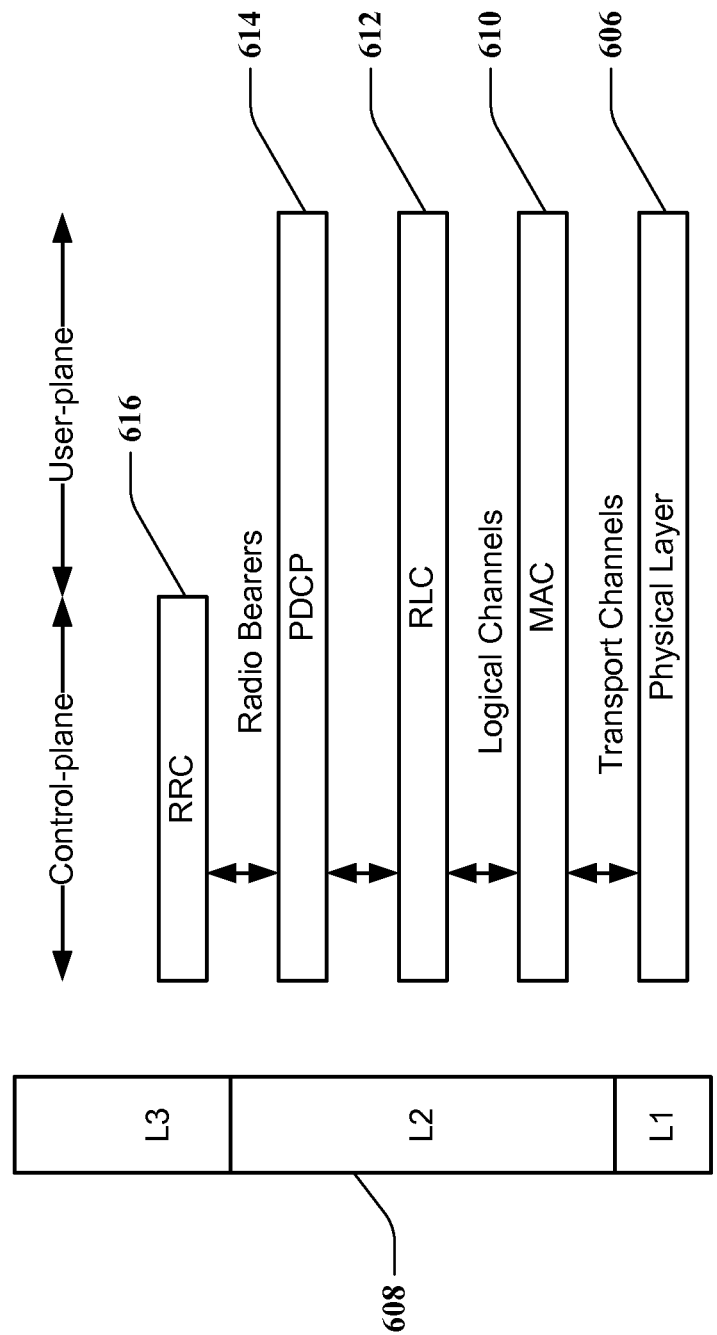
FIG. 6 is a diagram illustrating an example of a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3 (L3 layer). The RRC sublayer 616 is responsible for obtaining radio resources (i.e., radio bearers) and for configuring the lower layers using RRC signaling between the eNB and the UE.

Figure 7:
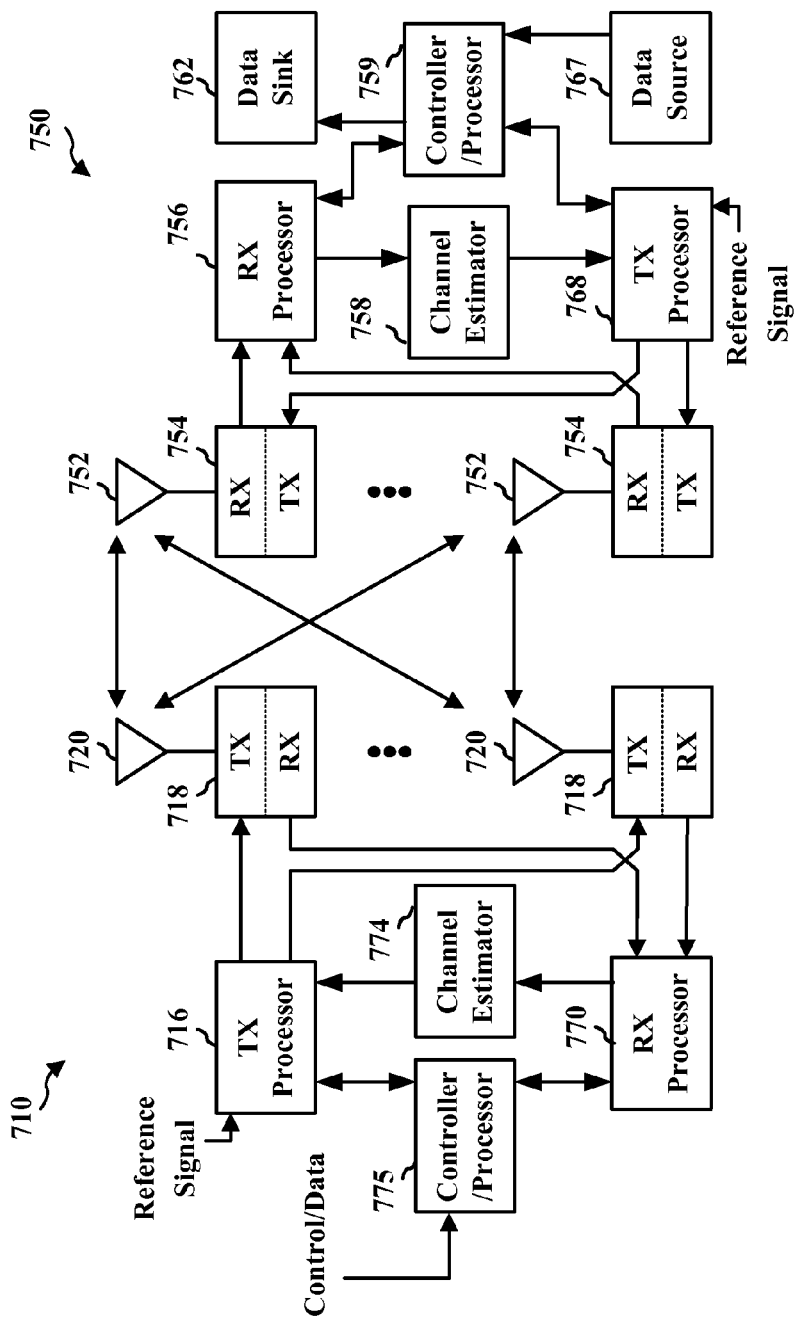
FIG. 7 is a diagram illustrating an example of an evolved Node B and user equipment in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 may implement the L1 layer.

The controller/processor 775 implements the L2 layer described earlier in connection with FIG. 6. In the UL, the control/processor 775 provides demultiplexing between transport and logical channels, packet reassembly, deciphering, header decompression, control signal processing to recover upper layer packets from the UE 750. Upper layer packets from the controller/processor 775 may be provided to the core network. The controller/processor 775 is also responsible for error detection using an ACK and/or NACK protocol to support HARQ operations. The processing system 114 described in relation to FIG. 1 includes the UE 750. In particular, the processing system 114 includes the TX processor 768, the RX processor 756, and the controller/processor 759.

Figure 8:
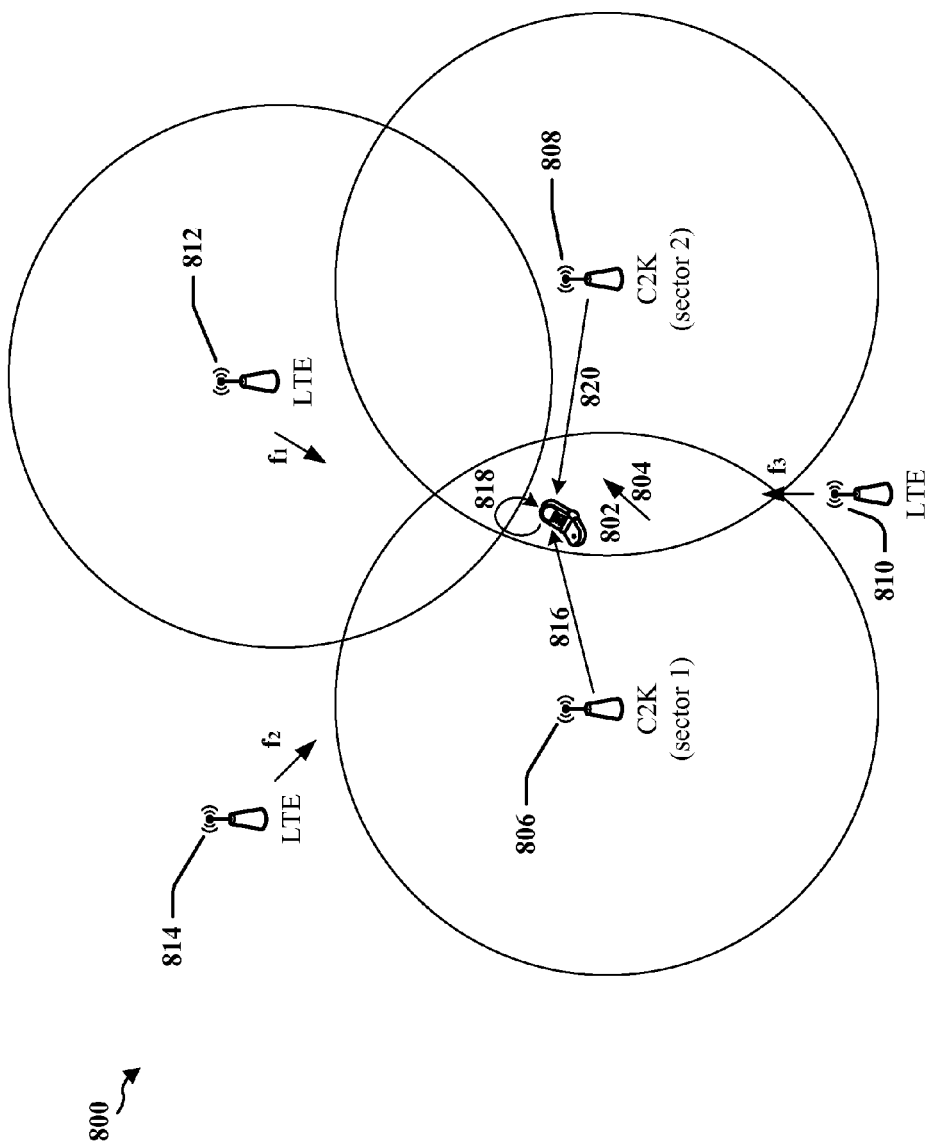
FIG. 8 is a diagram for illustrating an exemplary method.

FIG. 8 is a diagram 800 for illustrating an exemplary method. As shown in FIG. 8, the UE 802 is connected to a C2K base station (BS) (sector 1) 806 in a C2K network. The C2K BS 806 transmits a neighbor list 816 to the UE 802. The neighbor list 816 may be referred to as an OtherRATNeighborList. The neighbor list 816 includes carrier numbers for neighboring LTE eNBs in an LTE network. The carrier numbers are absolute radio frequency channel numbers (ARFCNs) indicating the frequencies of neighboring LTE cells. As such, the neighbor list 816 may include information indicating carrier frequency $f_1$ of the LTE eNB 812, carrier frequency $f_2$ of the LTE eNB 814, and carrier frequency $f_3$ of the LTE eNB 810. Receipt of the neighbor list 816 triggers the UE to start a process for reselecting to the LTE network. The UE 802 calculates the reverse signal strength indication (RSSI) for each of the frequencies $f_1$, $f_2$, and $f_3$. The RSSI is a measurement of the power/energy present in a received radio signal. If the RSSI for a frequency meets one or more criteria (e.g., the RSSI is greater than a threshold; criteria may be based on both LTE and serving C2K measurements), the UE 802 starts an EUTRAReselect timer for the frequency. Otherwise, if the one or more criteria are not satisfied, the UE 802 starts a backoff timer for the frequency so that the UE 802 refrains from performing measurements on the frequency until the backoff timer expires. Upon expiration of the EUTRAReselect timer for the frequency, the UE 802 again determines the RSSI for the frequency, and if the one or more criteria are again satisfied, the UE 802 reselects to the LTE network (i.e., the UE 802 moves to the LTE eNB corresponding to the frequency).

In FIG. 8, assume the UE 802 determined that the RSSI for frequency $f_1$ satisfied the one or more criteria, the RSSI for frequency $f_2$ did not satisfy the one or more criteria, and the RSSI for frequency $f_3$ did not satisfy the one or more criteria. Accordingly, the UE 802 starts an EUTRAReselect timer for frequency $f_1$, a backoff timer for frequency $f_2$, and a backoff timer for frequency $f_3$. The EUTRAReselect and backoff timers may be referred to as C2K-LTE reselection state information. The C2K-LTE reselection state information may include other state information other than the EUTRAReselect and backoff timers, such as other timer/counter information or information unrelated to a timer/counter. The UE 802 may store additional state information such as intermediate LTE measurements (e.g., if averaging is required). During each wakeup period (e.g., every 5.12 ms) for the UE 802, in addition to performing measurements on LTE neighbors, the UE 802 also evaluates the strength of its C2K neighbors. Assume the UE 802 is moving in the direction as shown by the arrow 804. Based on the C2K measurements on the serving C2K BS 806 and the neighboring C2K BS 808, the UE 802 moves (e.g., performs a C2K idle HO) from the C2K BS 806 to the C2K BS (sector 2) 808. Upon the move from the C2K BS 806 to the C2K BS 808, the UE 802 determines whether to maintain (818) the C2K-LTE reselection state information.

In a method A, the UE 802 resets the state (i.e., deletes the state information) upon the move from the C2K BS 806 to the C2K BS 808. In a method B, the UE 802 refrains from reselecting to the LTE network until a neighbor list 820 is received from the C2K BS 808, and determines whether to maintain the state based on the received neighbor list 820. In a method C, the UE 802 acts on cell-reselection events until the neighbor list 820 is received from the C2K BS 808, and upon receiving the neighbor list 820, determines whether to maintain the state based on the received neighbor list 820. In a method D, the UE 802 determines whether to maintain the state based on the state values, a time period T_max_hyst_reselect, and the neighbor list 820. The methods A, B, C, and D are described in more detail infra. In FIGS. 9-17, for purposes of illustration, the each wakeup period is assumed to be every 5.12 ms. However, the wakeup periods may differ.

Figure 9:
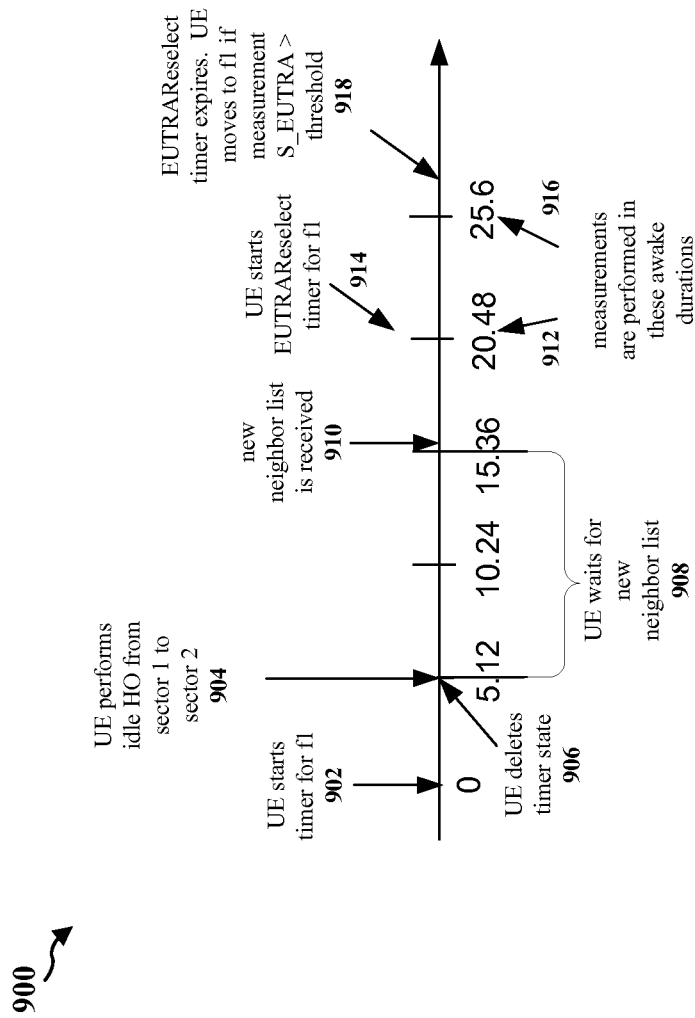
FIG. 9 is a diagram for illustrating a method A.

FIG. 9 is a diagram 900 for illustrating a method A. In the method A, the UE 802 resets the state upon the move from the C2K BS 806 to the C2K BS 808. As shown in FIG. 9, at time 0, the UE 802 starts a timer for $f_1$ (902). The timer may be an EUTRAReselect timer or a backoff timer. At time 5.12, the UE 802 performs an idle HO from the C2K BS 806 (sector 1) to the C2K BS 808 (sector 2) (904). Upon the move from the C2K BS 806 to the C2K BS 808, the UE 802 deletes the timer state (906). The UE 802 waits for a neighbor list 820 from the C2K BS 808 (908). After time 15.36, the UE 802 receives the new neighbor list 820 (910). Assume the neighbor list 820 includes information indicating frequency $f_1$. At time 20.48, the UE 802 determines that the RSSI for $f_1$ exceeds a threshold (912), and starts an EUTRAReselect timer for $f_1$ (914). The UE 802 may perform additional measurements on frequencies other than $f_1$ at time 25.6 (916). After the EUTRAReselect timer expires, the UE 802 determines the RSSI (referred to as S_EUTRA) for $f_1$, and reselects to the LTE eNB 812 if the S_EUTRA exceeds the threshold (918).

Figure 10:
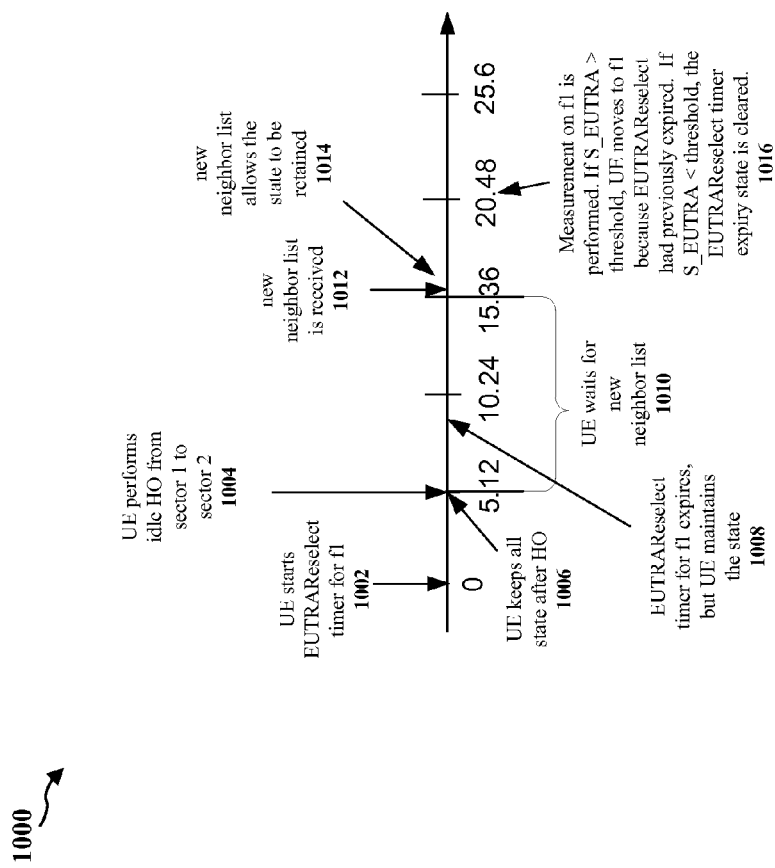
FIG. 10 is a first diagram for illustrating a method B.

FIG. 10 is a first diagram 1000 for illustrating a method B. In the method B, the UE 802 refrains from reselecting to the LTE network until a neighbor list 820 is received from the C2K BS 808, and determines whether to maintain the state based on the received neighbor list 820. Furthermore, the UE 802 refrains from performing measurements in the slot cycles after the idle HO and before the neighbor list 820 is received. FIG. 10 provides an example in which the EUTRAReselect timer is running for $f_1$ at the time of idle HO and expires while the UE 802 is waiting for the new neighbor list 820. As shown in FIG. 10, at time 0, the UE 802 starts a timer for $f_1$ (1002). Assume the timer is an EUTRAReselect timer. At time 5.12, the UE 802 performs an idle HO from the C2K BS 806 (sector 1) to the C2K BS 808 (sector 2) (1004). Upon the move from the C2K BS 806 to the C2K BS 808, the UE 802 maintains the timer state (1006). The UE 802 waits for a neighbor list 820 from the C2K BS 808 (1010). While the UE 802 waits for the neighbor list 820 (1010), the EUTRAReselect timer for $f_1$ expires (1008). However, the UE 802 does not immediately perform a measurement on $f_1$, but rather, maintains the state (1008) until the new neighbor list 820 is received. In this case, the state is an expired EUTRAReselect timer for $f_1$. After time 15.36, the UE 802 receives the new neighbor list 820 (1012). Assume the neighbor list 820 includes information indicating frequency $f_1$. Because the neighbor list 820 includes information indicating frequency $f_1$, the UE 802 maintains the state for frequency $f_1$ (1014). Had the neighbor list 820 not included information indicating frequency $f_1$, the UE 802 would delete the state for frequency $f_1$. At time 20.48, the UE 802 determines the RSSI (S_EUTRA) for $f_1$ (1016). If S_EUTRA is greater than a threshold, the UE 802 reselects to the LTE eNB 812 (1016). If S_EUTRA is less than the threshold, the UE 802 clears the state of the EUTRAReselect timer (1016).

Figure 11:
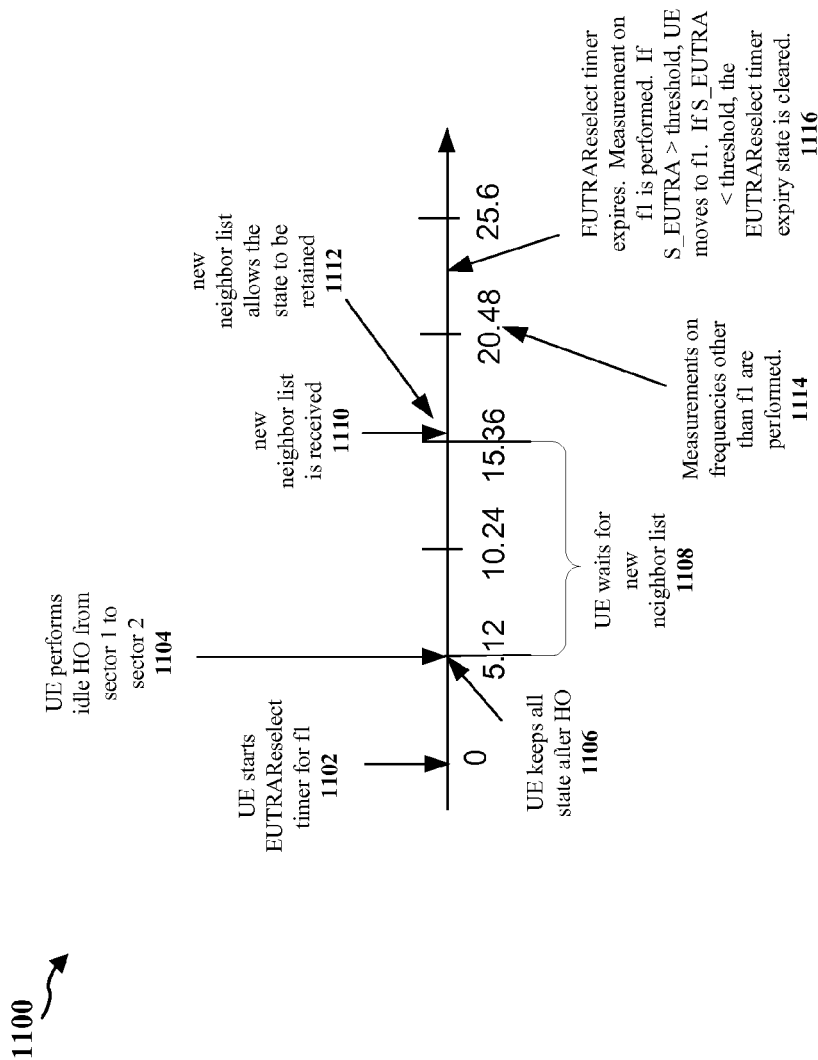
FIG. 11 is a second diagram for illustrating the method B.

FIG. 11 is a second diagram 1100 for illustrating the method B. FIG. 11 provides an example in which the EUTRAReselect timer is running for $f_1$ at the time of idle HO and expires after the UE 802 receives the new neighbor list 820. As shown in FIG. 11, at time 0, the UE 802 starts a timer for $f_1$ (1102). Assume the timer is an EUTRAReselect timer. At time 5.12, the UE 802 performs an idle HO from the C2K BS 806 (sector 1) to the C2K BS 808 (sector 2) (1104). Upon the move from the C2K BS 806 to the C2K BS 808, the UE 802 maintains the timer state (1106). The UE 802 waits for a neighbor list 820 from the C2K BS 808 (1108). After time 15.36, the UE 802 receives the new neighbor list 820 (1110). Assume the neighbor list 820 includes information indicating frequency $f_1$. Because the neighbor list 820 includes information indicating frequency $f_1$, the UE 802 maintains the state for frequency $f_1$ (1112). Had the neighbor list 820 not included information indicating frequency $f_1$, the UE 802 would delete the state for frequency $f_1$. At time 20.48, the EUTRAReselect timer still has not expired and therefore the UE 802 performs measurements on frequencies other than $f_1$ (1114). After time 20.48, the EUTRAReselect timer expires and the UE 802 determines the RSSI (S_EUTRA) for $f_1$ (1116). If S_EUTRA is greater than a threshold, the UE 802 reselects to the LTE eNB 812 (1016). If S_EUTRA is less than the threshold, the UE 802 clears the state of the EUTRAReselect timer (1016).

Figure 12:
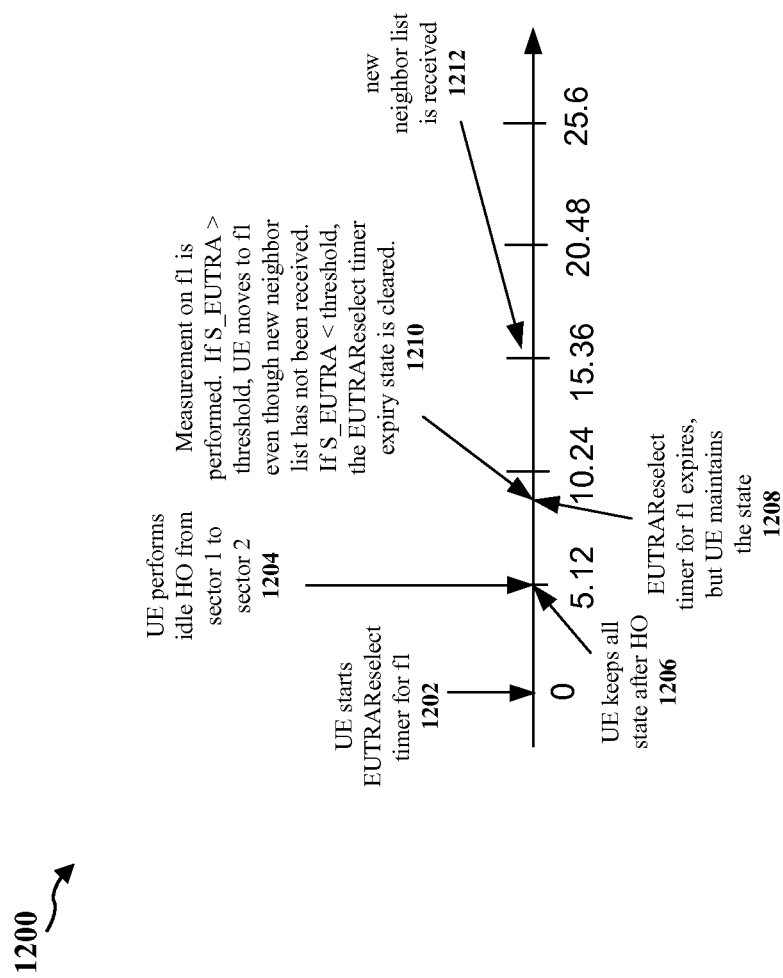
FIG. 12 is a first diagram for illustrating a method C.

FIG. 12 is a first diagram 1200 for illustrating a method C. In the method C, the UE 802 acts on cell-reselection events until the neighbor list 820 is received from the C2K BS 808, and upon receiving the neighbor list 820, determines whether to maintain the state based on the received neighbor list 820. As such, the UE 802 performs measurements in the slot cycles after the idle HO and before the neighbor list 820 is received. FIG. 12 provides an example in which the EUTRAReselect timer expires before the new neighbor list 820 is received. As shown in FIG. 12, at time 0, the UE 802 starts a timer for $f_1$ (1202). Assume the timer is an EUTRAReselect timer. At time 5.12, the UE 802 performs an idle HO from the C2K BS 806 (sector 1) to the C2K BS 808 (sector 2) (1204). Upon the move from the C2K BS 806 to the C2K BS 808, the UE 802 maintains the timer state (1206). After time 5.12 and before time 10.24, the EUTRAReselect timer for $f_1$ expires (1208). After the EUTRAReselect timer for $f_1$ expires, the UE 802 determines the RSSI (S_EUTRA) for $f_1$ (1210). If S_EUTRA is greater than a threshold, the UE 802 reselects to the LTE eNB 812 (1210). If S_EUTRA is less than the threshold, the UE 802 clears the state of the EUTRAReselect timer (1210). At time 15.36, the UE 802 receives the new neighbor list 820 (1212). As such, as demonstrated in this example, upon an idle HO from a first C2K BS to a second C2K BS and while the UE 802 is being served by the second C2K BS, the UE 802 acts on cell-reselection events based on C2K-LTE reselection state information created while the UE 802 was served by the first C2K BS.

Figure 13:
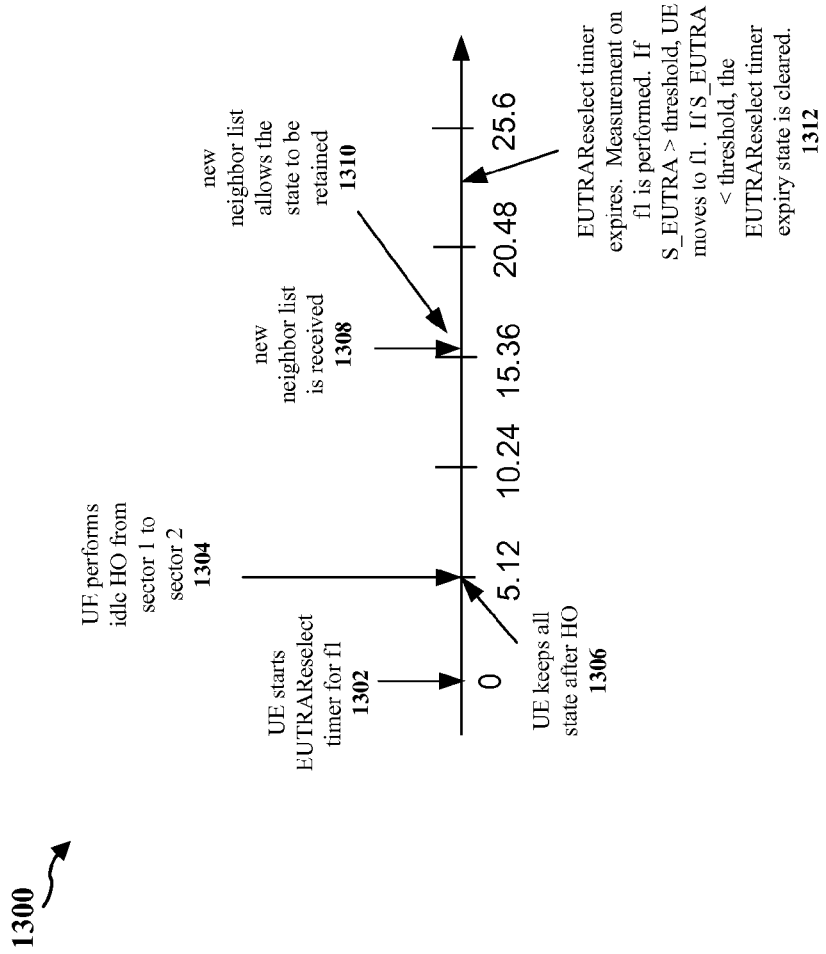
FIG. 13 is a second diagram for illustrating the method C.

FIG. 13 is a second diagram 1300 for illustrating the method C. FIG. 13 provides an example in which the EUTRAReselect timer expires after the new neighbor list 820 is received. As shown in FIG. 13, at time 0, the UE 802 starts a timer for $f_1$ (1302). Assume the timer is an EUTRAReselect timer. At time 5.12, the UE 802 performs an idle HO from the C2K BS 806 (sector 1) to the C2K BS 808 (sector 2) (1304). Upon the move from the C2K BS 806 to the C2K BS 808, the UE 802 maintains the timer state (1306). After time 15.36, the UE 802 receives the new neighbor list 820 (1308). Assume the neighbor list 820 includes information indicating frequency $f_1$. Because the neighbor list 820 includes information indicating frequency $f_1$, the UE 802 maintains the state for frequency $f_1$ (1310). Had the neighbor list 820 not included information indicating frequency $f_1$, the UE 802 would delete the state for frequency $f_1$. After time 20.48, the EUTRAReselect timer for $f_1$ expires (1312). After the EUTRAReselect timer for $f_1$ expires, the UE 802 determines the RSSI (S_EUTRA) for $f_1$ (1312). If S_EUTRA is greater than a threshold, the UE 802 reselects to the LTE eNB 812 (1312). If S_EUTRA is less than the threshold, the UE 802 clears the state of the EUTRAReselect timer (1312). As such, as demonstrated in this example, upon an idle HO from a first C2K BS to a second C2K BS and while the UE 802 is being served by the second C2K BS, the UE 802 acts on cell-reselection events based on C2K-LTE reselection state information that was created while the UE 802 was served by the first C2K BS and maintained based on a neighbor list 820 received from the second C2K BS.

In a method D, the UE 802 determines whether to maintain the state based on the state values, a time period T_max_hyst_reselect, and the neighbor list 820. Specifically, in method D, the UE 802 delays reselection to LTE, but because the EUTRAReselect time can be large, the time for which the UE 802 waits for the EUTRAReselect timer to expire is capped by the time period T_max_hyst_reselect. After the idle HO, the UE 802 determines if there are frequencies for which the EUTRAReselect timer is running. If, after the idle HO, there are no frequencies for which the EUTRAReselect timer is running, the UE 802 resets the C2K-LTE reselection state information and waits for the new neighbor list 820. If, after the idle HO, there are one or more frequencies for which corresponding EUTRAReselect timers are running, the UE 802 determines whether any of those EUTRAReselect timers are scheduled to expire within the time period T_max_hyst_reselect. If all of those EUTRAReselect timers are scheduled to expire after the time period T_max_hyst_reselect, the UE 802 resets the C2K-LTE reselection state information and waits for the new neighbor list 820. However, for each frequency for which the EUTRAReselect timer is scheduled to expire within the time period T_max_hyst_reselect, the UE 802 waits for the EUTRAReselect timer to expire. If the new neighbor list 820 is received within the time period T_max_hyst_reselect and does not match the old neighbor list 820 (or does not include frequencies for which there are active C2K-LTE reselection state information), the new neighbor list 820 is stored/cached for later use after the last of the EUTRAReselect timers expire within the time period T_max_hyst_reselect. Examples for method D are provided infra with respect to FIGS. 14-17.

Figure 14:
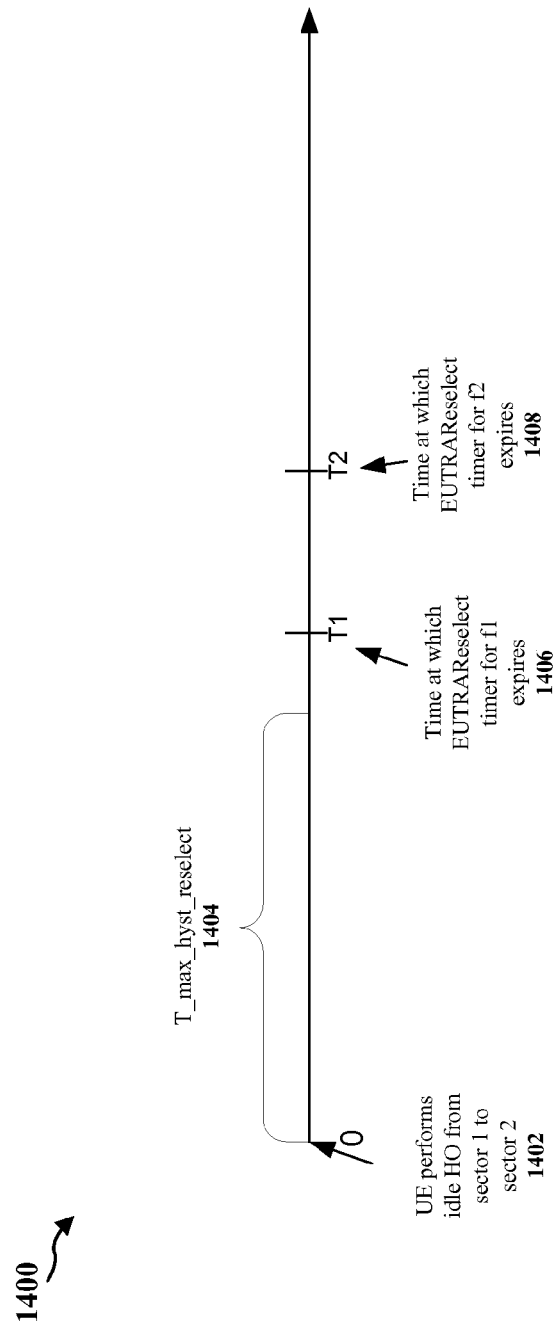
FIG. 14 is a first diagram for illustrating a method D.

FIG. 14 is a first diagram 1400 for illustrating the method D. FIG. 14 provides an example in which all EUTRAReselect timers are scheduled to expire after the time period T_max_ hyst_reselect. Assume for FIG. 14 that the neighbor list 816 indicated frequencies $f_1$ and $f_2$. At time 0, the UE 802 performs an idle HO from the C2K BS 806 (sector 1) to the C2K BS 808 (sector 2) (1402). After the idle HO, the EUTRAReselect timer for $f_1$ is T1 (i.e., time T1 remains) (1406) and the EUTRAReselect timer for $f_2$ is T2 (i.e., time T2 remains) (1408). Because T1 and T2 are greater than T_max_hyst_reselect 1404, the UE 802 immediately resets the C2K-LTE reselection state information after the idle HO and waits for the new neighbor list 820 to build the new frequency list.

Figure 15:
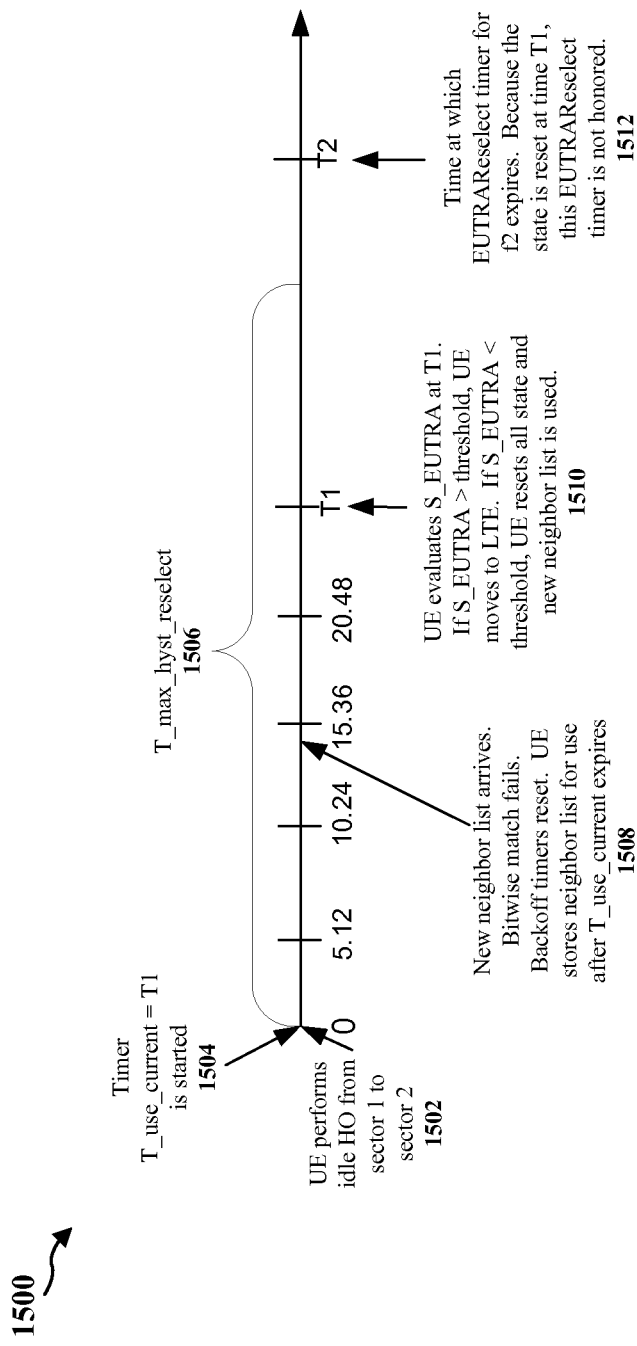
FIG. 15 is a second diagram for illustrating the method D.

FIG. 15 is a second diagram 1500 for illustrating the method D. FIG. 15 provides an example in which one EUTRAReselect timer is scheduled to expire before the time period T_max_hyst_reselect, one EUTRAReselect timer is scheduled to expire after the time period T_max_hyst_reselect, and the neighbor lists 816, 820 differ. Assume for FIG. 15 that the neighbor list 816 indicated frequencies $f_1$ and $f_2$. At time 0, the UE 802 performs an idle HO from the C2K BS 806 (sector 1) to the C2K BS 808 (sector 2) (1502). After time 0, the UE 802 sets a timer T_use_current to the greatest time value less than the value T_max_hyst_reselect 1506 for an EUTRAReselect timer (1504). After the idle HO, the EUTRAReselect timer for $f_1$ is T1 and the EUTRAReselect timer for $f_2$ is T2. The EUTRAReselect time T1 is less than T_max_hyst_reselect 1506 and the EUTRAReselect time T2 is greater than T_max_hyst_reselect 1506. Accordingly, the UE 802 sets the timer T_use_current with a time equal to T1 (1504). After time 10.24, the new neighbor list 820 is received, but does not bitwise match the old neighbor list 816, or otherwise, does not indicate frequencies $f_1$ and $f_2$ (1508). The UE 802 resets the backoff timers for all frequencies and stores/caches the new neighbor list 820 for use after the time period T_use_current (1508). At time T1, the EUTRAReselect timer for $f_1$ expires, and the UE 802 determines the RSSI (S_EUTRA) for $f_1$ (1510). If S_EUTRA is greater than a threshold, the UE 802 reselects to the LTE eNB 812 (1510). If S_EUTRA is less than the threshold, the UE 802 clears the state of the EUTRAReselect timers and builds a new frequency list based on the cached neighbor list 820 (1510). At time T2, the EUTRAReselect timer for $f_2$ expires (1512). However, because the state was reset at time T1, the EUTRAReselect timer for $f_2$ is not honored (1512).

Figure 16:
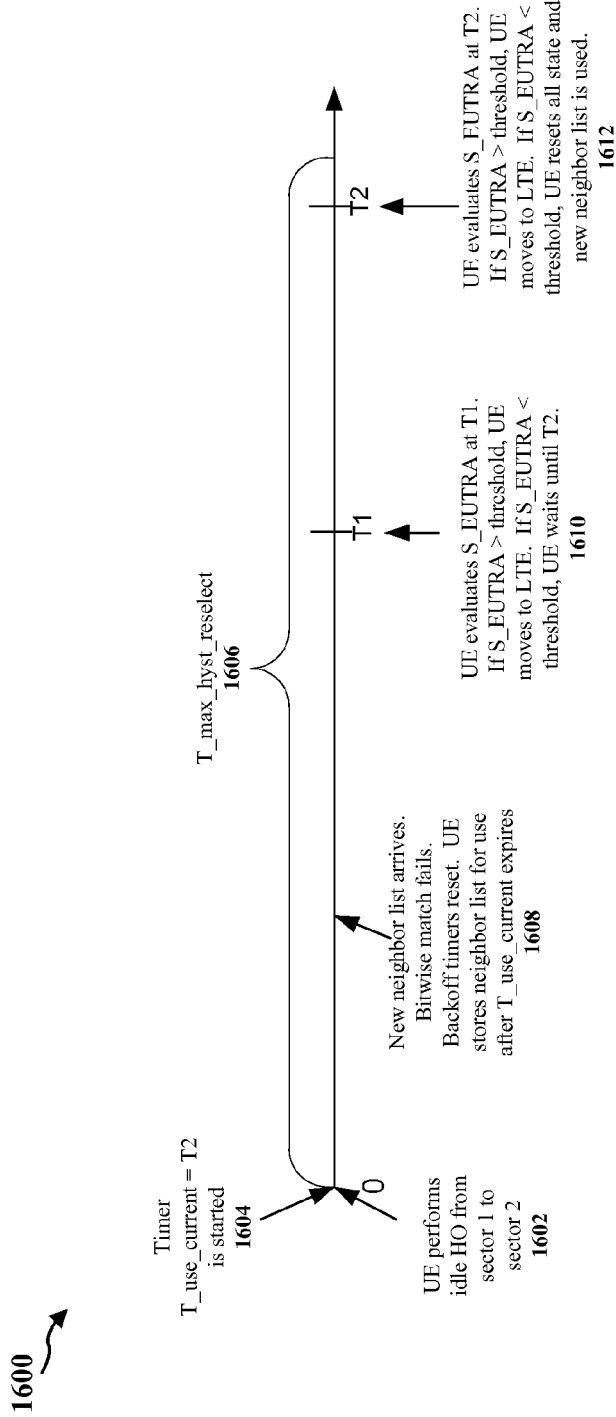
FIG. 16 is a third diagram for illustrating the method D.

FIG. 16 is a third diagram 1600 for illustrating the method D. FIG. 16 provides an example in which two EUTRAReselect timers are scheduled to expire before the time period T_max_hyst_reselect and the neighbor lists 816, 820 differ. Assume for FIG. 16 that the neighbor list 816 indicated frequencies $f_1$ and $f_2$. At time 0, the UE 802 performs an idle HO from the C2K BS 806 (sector 1) to the C2K BS 808 (sector 2) (1602). After the idle HO, the EUTRAReselect timer for $f_1$ is T1 and the EUTRAReselect timer for $f_2$ is T2. The EUTRAReselect time T2 is greater than the EUTRAReselect time T1, and the EUTRAReselect time T2 is less than T_max_hyst_reselect 1606. Accordingly, the UE 802 sets the timer T_use_current with a time equal to T2 (1604). Before time T1, the new neighbor list 820 is received, but does not bitwise match the old neighbor list 816, or otherwise, does not indicate frequencies $f_1$ and $f_2$ (1608). The UE 802 resets the backoff timers for all frequencies and stores/caches the new neighbor list 820 for use after the time period T_use_current (1608). At time T1, the EUTRAReselect timer for $f_1$ expires, and the UE 802 determines the RSSI (S_EUTRA) for $f_1$ (1610). If S_EUTRA is greater than a threshold, the UE 802 reselects to the LTE eNB 812 (1610). If S_EUTRA is less than the threshold, the UE 802 waits until time T2 (1610). Assuming the UE 802 does not reselect to the LTE eNB 812, at time T2, the EUTRAReselect timer for $f_2$ expires, and the UE 802 determines the RSSI (S_EUTRA) for $f_2$ (1612). If S_EUTRA is greater than a threshold, the UE 802 reselects to the LTE eNB 814 (1612). If S_EUTRA is less than the threshold, the UE 802 clears the state of the EUTRAReselect timers and builds a new frequency list based on the cached neighbor list 820 (1612).

Figure 17:
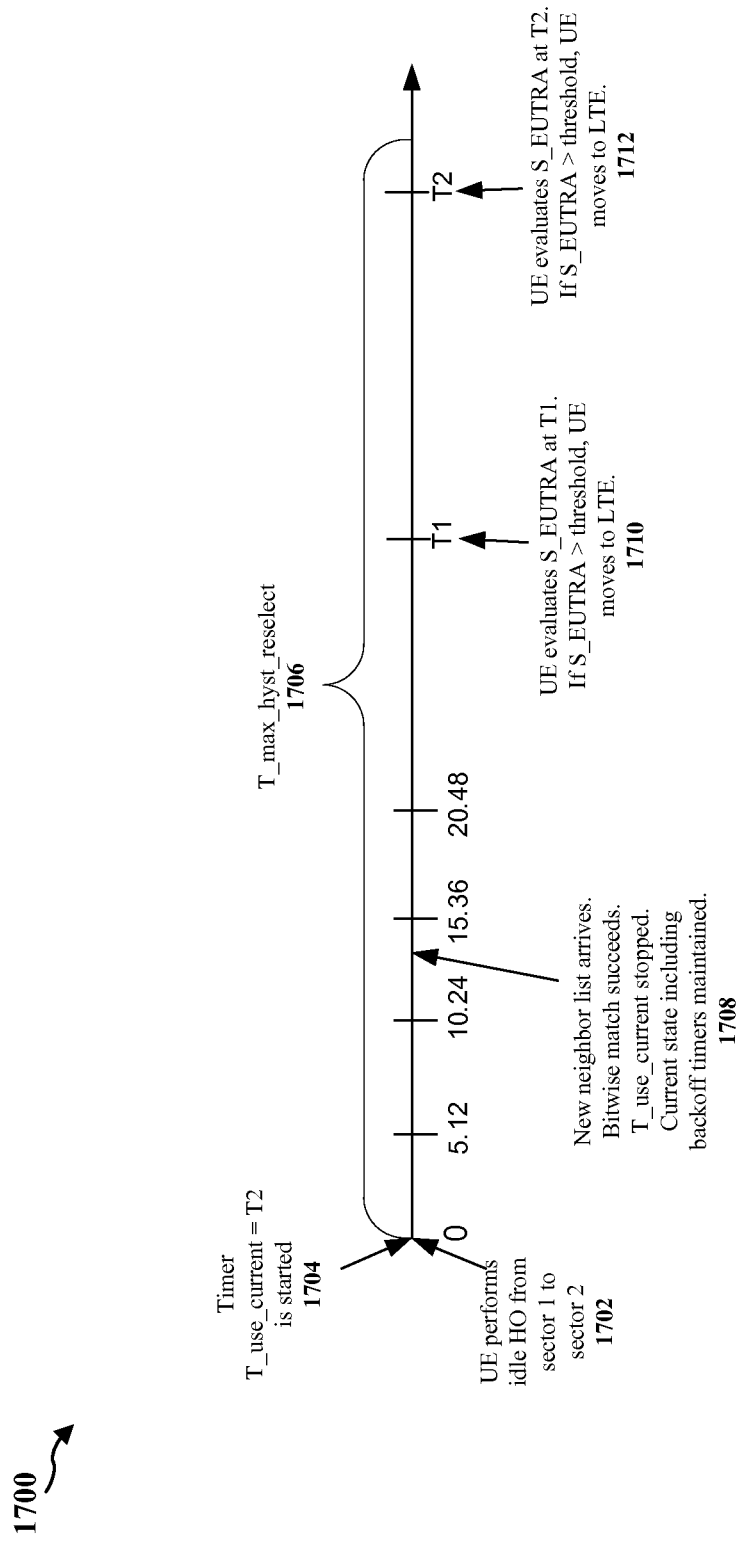
FIG. 17 is a fourth diagram for illustrating the method D.

FIG. 17 is a fourth diagram 1700 for illustrating the method D. FIG. 17 provides an example in which two EUTRAReselect timers are scheduled to expire before the time period T_max_hyst_reselect and the neighbor lists 816, 820 do not differ, or otherwise, neighbor list 820 indicates frequencies $f_1$ and $f_2$. Assume for FIG. 17 that the neighbor list 816 indicated frequencies $f_1$ and $f_2$. At time 0, the UE 802 performs an idle HO from the C2K BS 806 (sector 1) to the C2K BS 808 (sector 2) (1702). After the idle HO, the EUTRAReselect timer for $f_1$ is T1 and the EUTRAReselect timer for $f_2$ is T2. The EUTRAReselect time T2 is greater than the EUTRAReselect time T1, and the EUTRAReselect time T2 is less than T_max_hyst_reselect 1706. Accordingly, the UE 802 sets the timer T_use_current with a time equal to T2 (1704). Before time T1, the new neighbor list 820 is received and bitwise matches the old neighbor list 816, or otherwise, indicates frequencies $f_1$ and $f_2$ (1708). The UE 802 stops the timer T_use_current and maintains the C2K-LTE reselection state information, including all backoff timers (1708). At time T1, the EUTRAReselect timer for $f_1$ expires, and the UE 802 determines the RSSI (S_EUTRA) for $f_1$ (1710). If S_EUTRA is greater than a threshold, the UE 802 reselects to the LTE eNB 812 (1710). If S_EUTRA is less than the threshold, the UE 802 clears the state of the EUTRAReselect timer for $f_1$. Assuming the UE 802 does not reselect to the LTE eNB 812, at time T2, the EUTRAReselect timer for $f_2$ expires, and the UE 802 determines the RSSI (S_EUTRA) for $f_2$ (1712). If S_EUTRA is greater than a threshold, the UE 802 reselects to the LTE eNB 814 (1712). If S_EUTRA is less than the threshold, the UE 802 clears the state of the EUTRAReselect timer for $f_2$.

Figure 18:
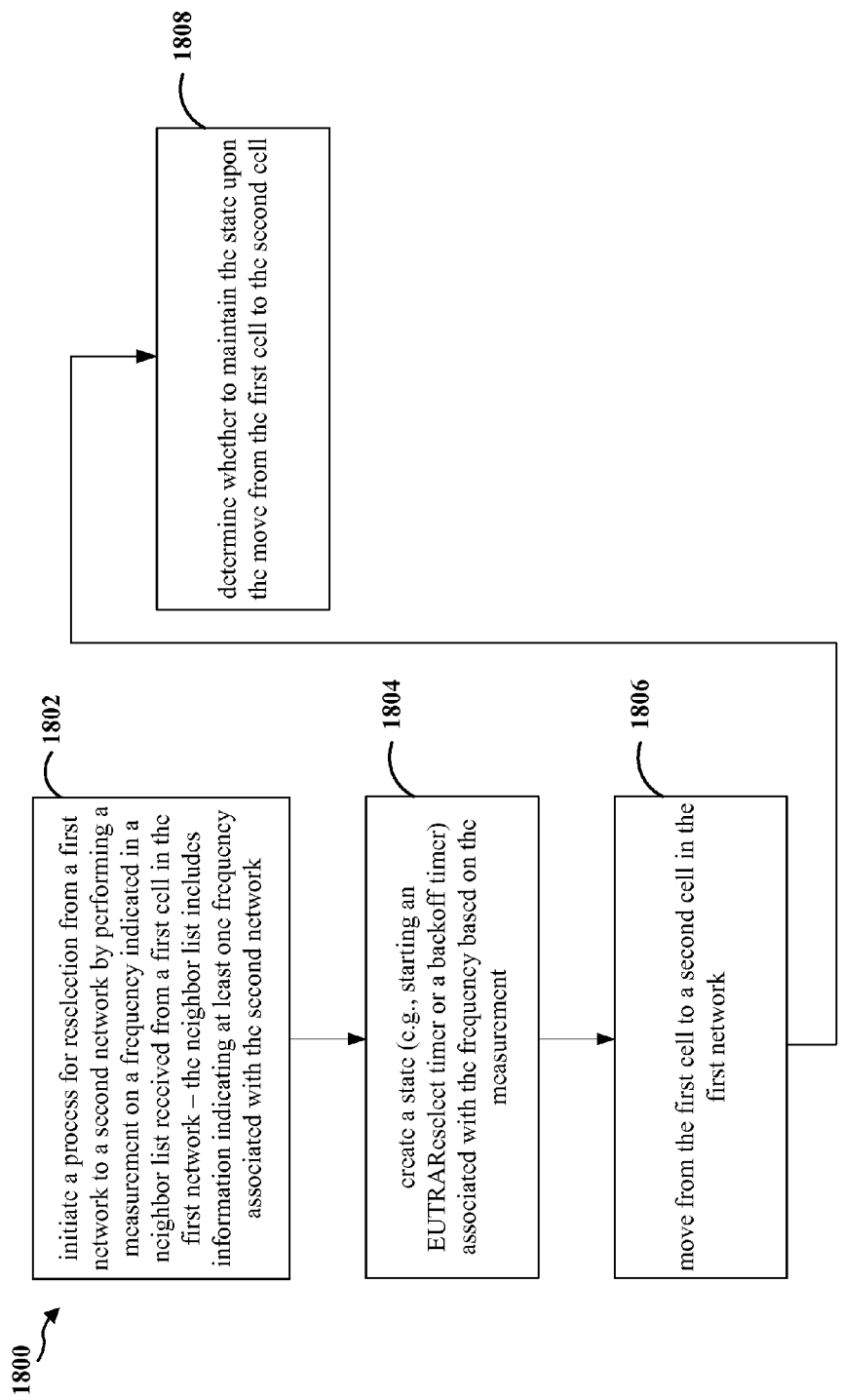
FIG. 18 is a flow chart for methods A, B, C, and D.

FIG. 18 is a flow chart 1800 for methods A, B, C, and D. The method may be performed by a UE, such as the UE 802. The UE initiates a process for reselection from a first network (e.g., CDMA2000) to a second network (e.g., LTE) by performing a measurement (e.g., RSSI) on a frequency indicated in a neighbor list 816 received from a first cell in the first network (1802). The neighbor list 816 includes information indicating at least one frequency associated with the second network (1802). The UE creates a state associated with the frequency based on the measurement (1804). After the UE creates the state, the UE moves (e.g., idle handoff) from the first cell to a second cell in the first network (1806). The UE determines whether to maintain the state upon the move from the first cell to the second cell (1808).

The UE may create the state in step 1804 by starting a first timer (e.g., EUTRAReselect timer) when the measurement is greater than a threshold. An expiration of the first timer is associated with performing a second measurement on the frequency. In addition, the UE may create the state in step 1804 by starting a second timer (e.g., backoff timer) when the measurement is less than the threshold. An expiration of the second timer is associated with re-performing the measurement on the frequency.

Figure 19:
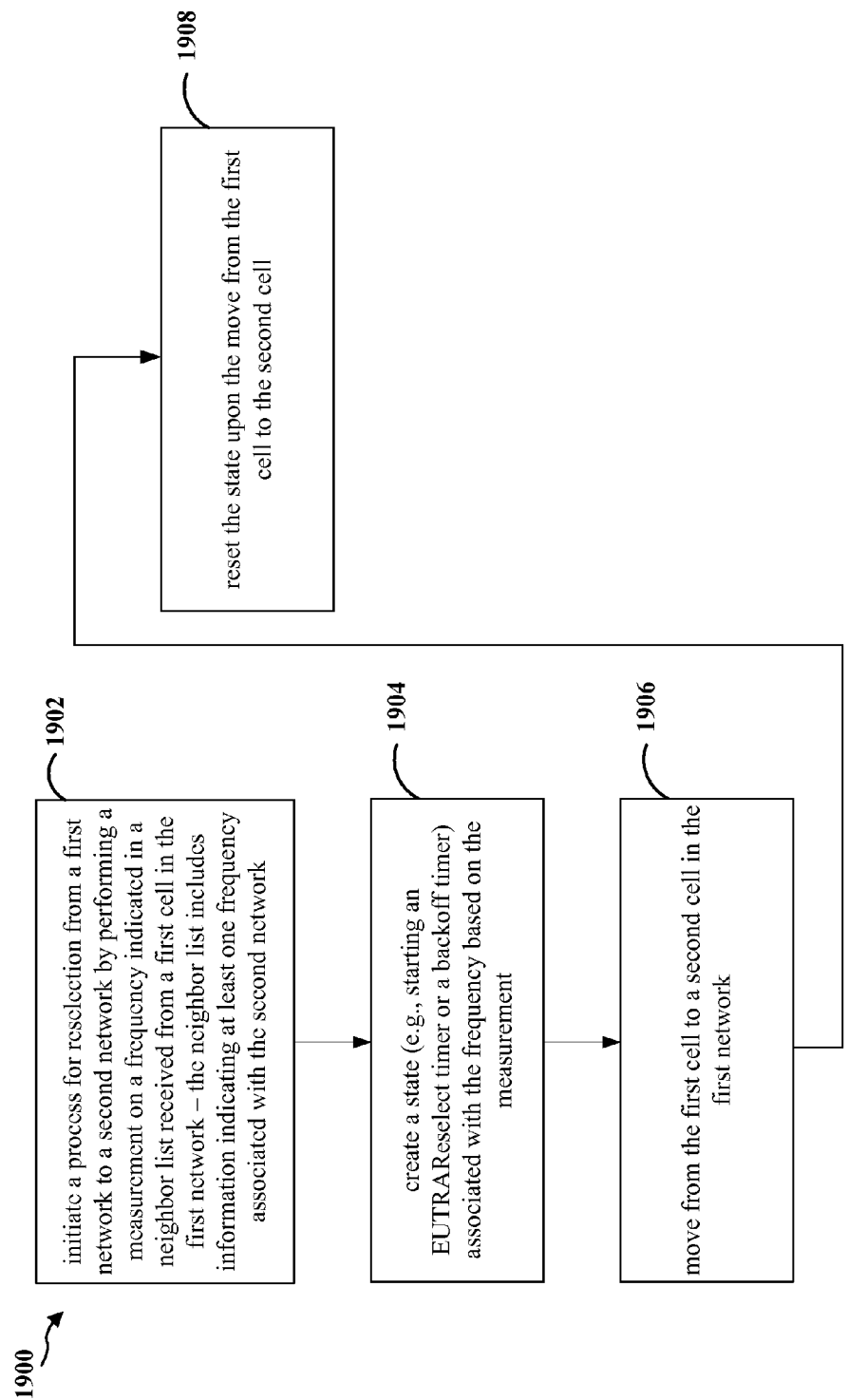
FIG. 19 is a flow chart for method A.

FIG. 19 is a flow chart 1900 for method A. The method may be performed by a UE, such as the UE 802. The UE initiates a process for reselection from a first network (e.g., CDMA2000) to a second network (e.g., LTE) by performing a measurement (e.g., RSSI) on a frequency indicated in a neighbor list 816 received from a first cell in the first network (1902). The neighbor list 816 includes information indicating at least one frequency associated with the second network (1902). The UE creates a state associated with the frequency based on the measurement (1904). After the UE creates the state, the UE moves (e.g., idle handoff) from the first cell to a second cell in the first network (1906). The UE determines to reset the state upon the move from the first cell to the second cell (1908).

Figure 20:
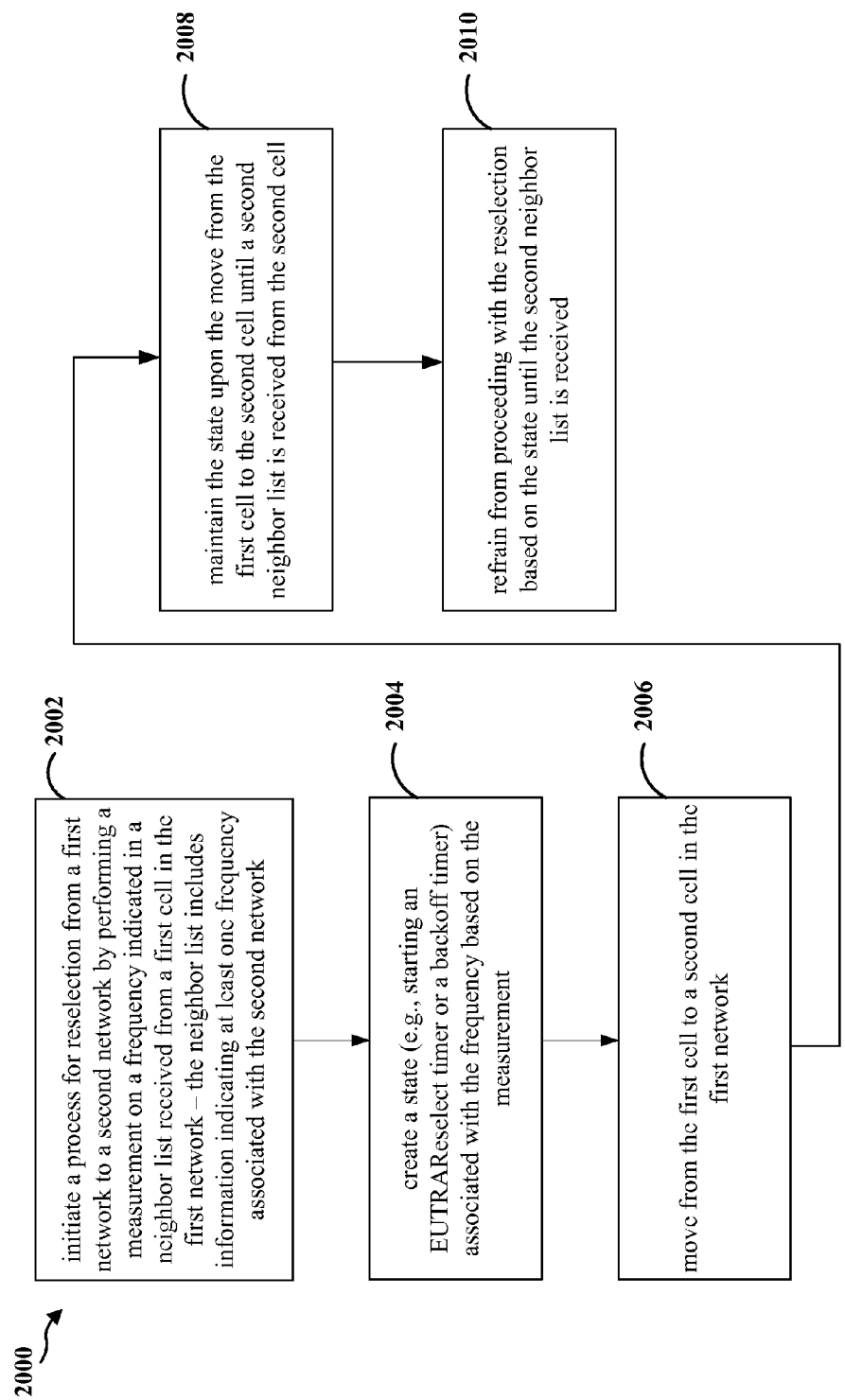
FIG. 20 is a flow chart for method B.

FIG. 20 is a flow chart 2000 for method B. The method may be performed by a UE, such as the UE 802. The UE initiates a process for reselection from a first network (e.g., CDMA2000) to a second network (e.g., LTE) by performing a measurement (e.g., RSSI) on a frequency indicated in a neighbor list 816 received from a first cell in the first network (2002). The neighbor list 816 includes information indicating at least one frequency associated with the second network (2002). The UE creates a state associated with the frequency based on the measurement (2004). After the UE creates the state, the UE moves (e.g., idle handoff) from the first cell to a second cell in the first network (2006). The UE determines to maintain the state upon the move from the first cell to the second cell until a second neighbor list 820 is received from the second cell (2008). In addition, the UE refrains from proceeding with the reselection based on the state until the second neighbor list 820 is received (2010).

Figure 21:
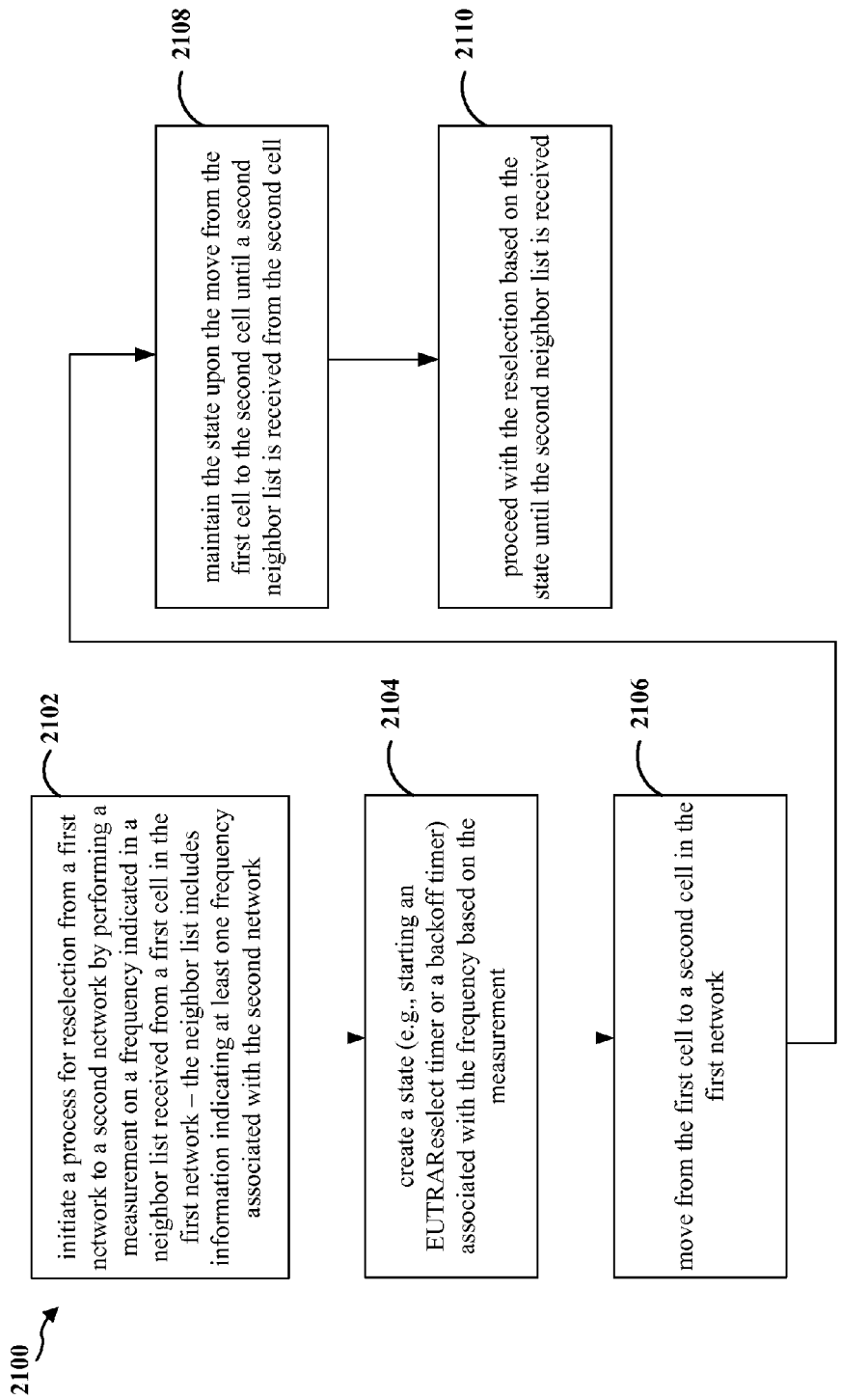
FIG. 21 is a flow chart for method C.

FIG. 21 is a flow chart 2100 for method C. The method may be performed by a UE, such as the UE 802. The UE initiates a process for reselection from a first network (e.g., CDMA2000) to a second network (e.g., LTE) by performing a measurement (e.g., RSSI) on a frequency indicated in a neighbor list 816 received from a first cell in the first network (2102). The neighbor list 816 includes information indicating at least one frequency associated with the second network (2102). The UE creates a state associated with the frequency based on the measurement (2104). After the UE creates the state, the UE moves (e.g., idle handoff) from the first cell to a second cell in the first network (2106). The UE determines to maintain the state upon the move from the first cell to the second cell until a second neighbor list 820 is received from the second cell (2108). In addition, the UE proceeds with the reselection based on the state until the second neighbor list 820 is received (2110).

Figure 22:
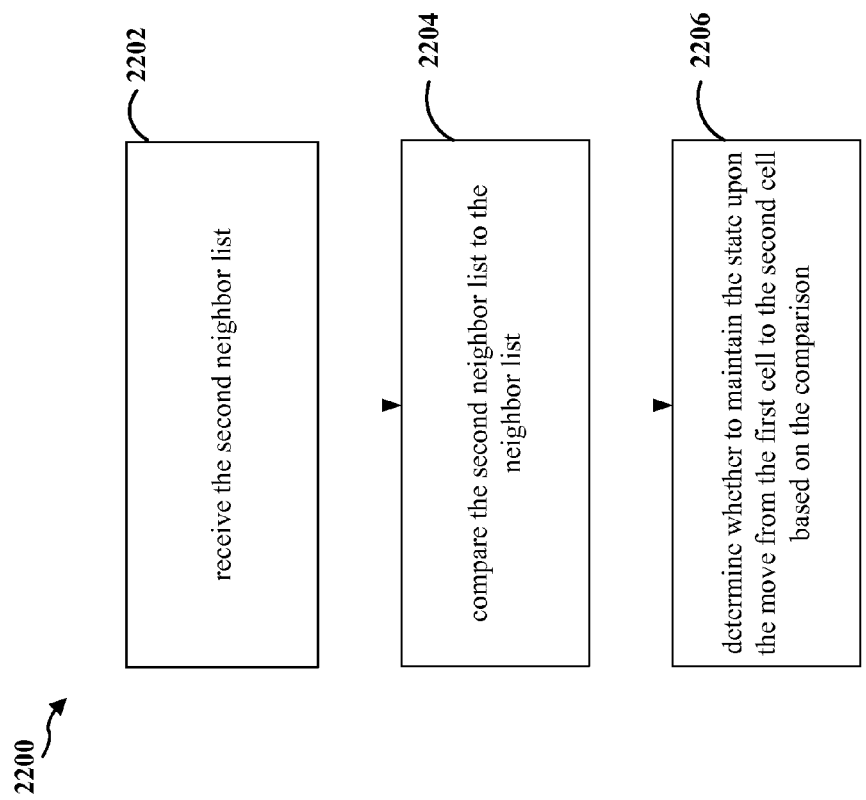
FIG. 22 is a first flow chart for methods B and C.

FIG. 22 is a first flow chart 2200 for methods B and C. The method may be performed by a UE, such as the UE 802. The UE receives the second neighbor list 820 (2202) and compares the second neighbor list 820 to the neighbor list 816 (2204). In addition, the UE determines whether to maintain the state upon the move from the first cell to the second cell based on the comparison (2206).

Figure 23:
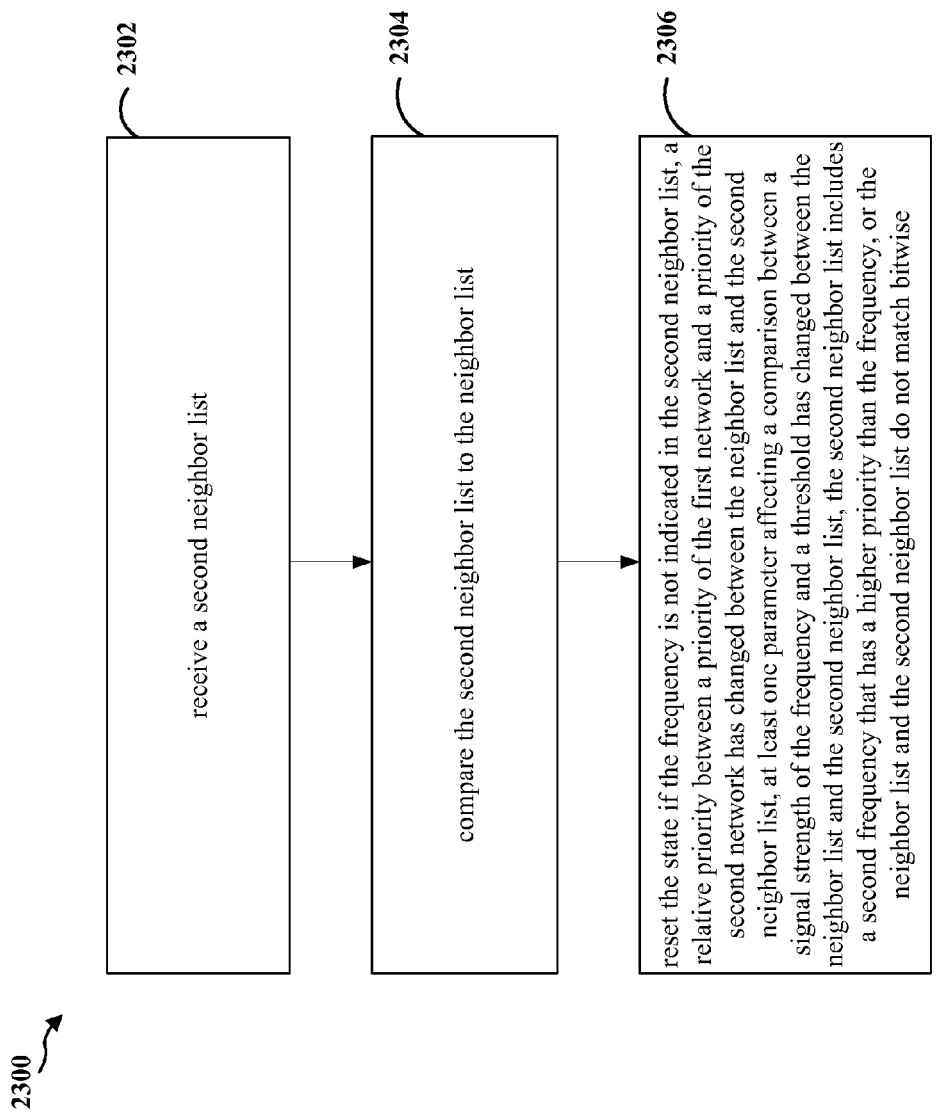
FIG. 23 is a second flow chart for methods B and C.

FIG. 23 is a second flow chart 2300 for methods B and C. The method may be performed by a UE, such as the UE 802. The UE receives a second neighbor list 820 (2302) and compares the second neighbor list 820 to the neighbor list 816 (2304). In addition, the UE resets the state if the frequency is not indicated in the second neighbor list 820, a relative priority between a priority of the first network and a priority of the second network has changed between the neighbor list 816 and the second neighbor list 820, at least one parameter affecting a comparison between a signal strength of the frequency and a threshold has changed between the neighbor list 816 and the second neighbor list 820 (e.g., parameters for calculating S_EUTRA have changed), the second neighbor list 820 includes a second frequency that has a higher priority than the frequency, or the neighbor list 816 and the second neighbor list 820 do not match bitwise.

Figure 24:
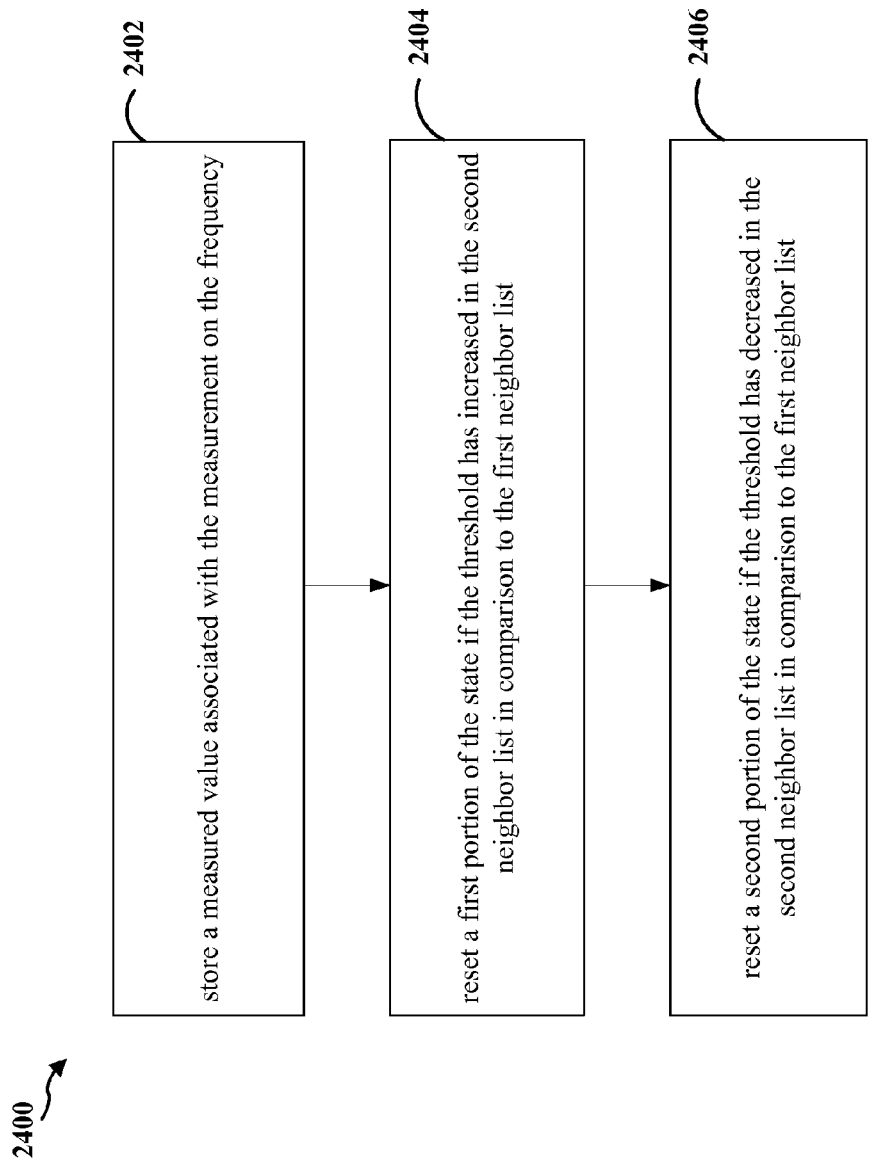
FIG. 24 is a third flow chart for methods B and C.

FIG. 24 is a third flow chart 2400 for methods B and C. The method may be performed by a UE, such as the UE 802, when the threshold for setting the EUTRAReselect/backoff timers changes. The UE stores a measured value associated with the measurement on the frequency (2402). The UE resets a first portion of the state (e.g., EUTRAReselect timer) if the threshold has increased in the second neighbor list 820 in comparison to the neighbor list 816 (2404). The UE resets a second portion of the state (e.g., backoff timer) if the threshold has decreased in the second neighbor list in comparison to the neighbor list (2406). In one configuration, the UE resets the first portion of the state (e.g., EUTRAReselect timer) if the threshold has increased in the second neighbor list 820 in comparison to the neighbor list 816 by more than the measured value, and resets the second portion of the state (e.g., backoff timer) if the threshold has decreased in the second neighbor list 820 in comparison to the neighbor list 816 by more than the measured value.

Figure 25:
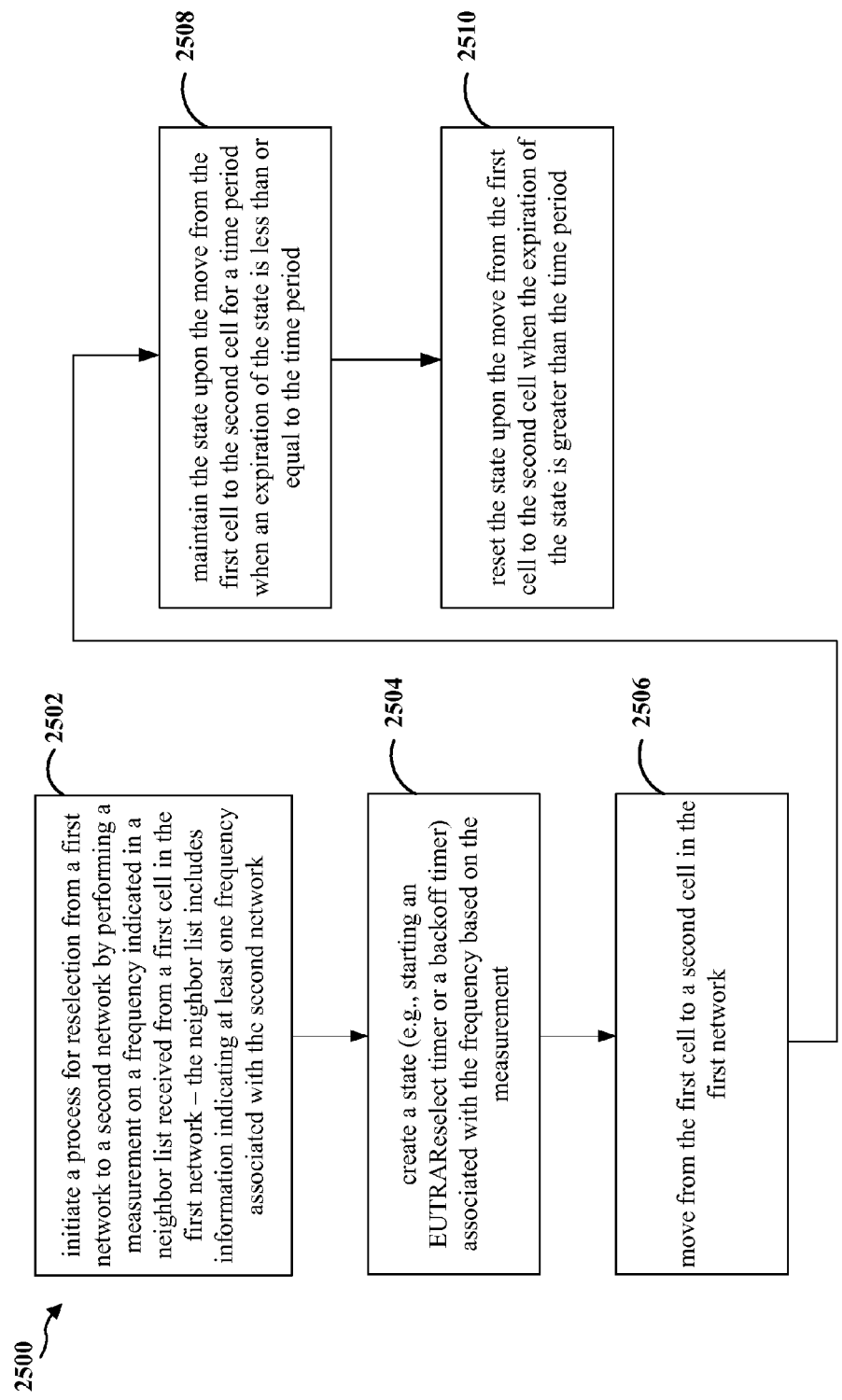
FIG. 25 is a first flow chart for method D.

FIG. 25 is a first flow chart 2500 for method D. The method may be performed by a UE, such as the UE 802. The UE initiates a process for reselection from a first network (e.g., CDMA2000) to a second network (e.g., LTE) by performing a measurement (e.g., RSSI) on a frequency indicated in a neighbor list 816 received from a first cell in the first network (2502). The neighbor list 816 includes information indicating at least one frequency associated with the second network (2502). The UE creates a state associated with the frequency based on the measurement (2504). After the UE creates the state, the UE moves (e.g., idle handoff) from the first cell to a second cell in the first network (2506). The UE determines to maintain the state (e.g., EUTRAReselect timer T1) upon the move from the first cell to the second cell for a time period (e.g., T_max_hyst_reselect) when an expiration of the state is less than or equal to the time period (2508). The UE resets the state upon the move from the first cell to the second cell when the expiration of the state is greater than the time period (2510) (e.g., see FIG. 14).

Figure 26:
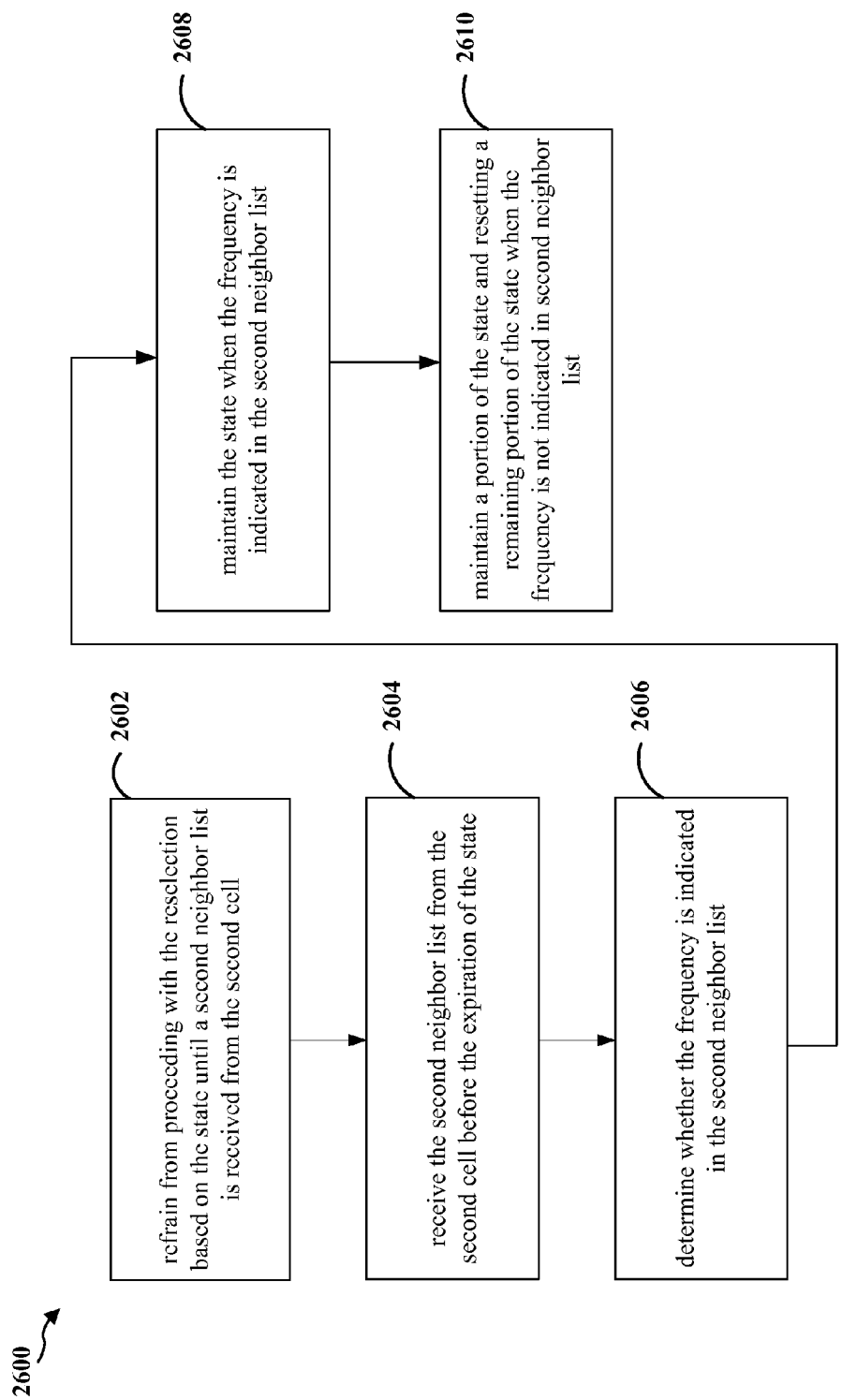
FIG. 26 is a second flow chart for method D.

FIG. 26 is a second flow chart 2600 for method D. The method may be performed by a UE, such as the UE 802. Upon maintaining the state in step 2508, the UE may perform additional steps as shown in FIG. 26. As shown in FIG. 26, the UE refrains from proceeding with the reselection based on the state until a second neighbor list 820 is received from the second cell (2602). The UE receives the second neighbor list 810 from the second cell before the expiration of the state (2604). The UE determines whether the frequency is indicated in the second neighbor list 820 (2606), or otherwise, determines whether the neighbor lists 816, 820 match bitwise. The UE maintains the state when the frequency is indicated in the second neighbor list, or otherwise, the neighbor lists 816, 820 bitwise match (2608) (see FIG. 17). The UE maintains a portion of the state (e.g., EUTRAReselect timer) and resets a remaining portion of the state (e.g., backoff timers) when the frequency is not indicated in second neighbor list 820, or otherwise, the neighbor lists 816, 820 do not bitwise match (2610) (see FIGS. 15, 16).

Figure 27:
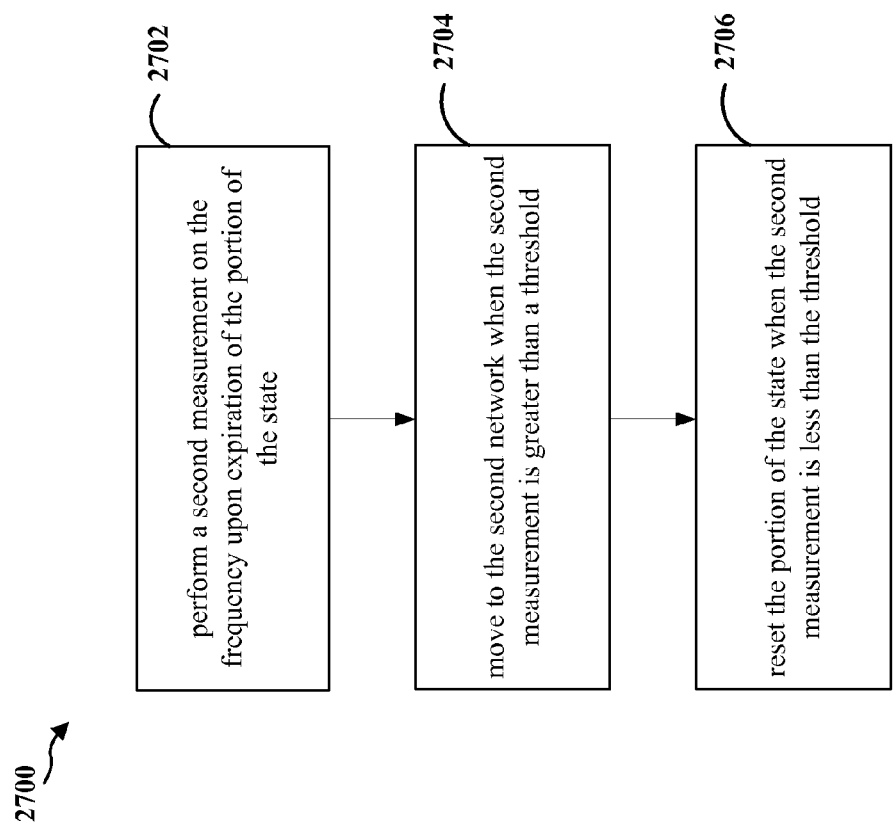
FIG. 27 is a third flow chart for method D.

FIG. 27 is a third flow chart 2700 for method D. The method may be performed by a UE, such as the UE 802. The UE performs a second measurement on the frequency upon expiration of the portion of the state (2702), moves to the second network when the second measurement is greater than a threshold (2704), and resets the portion of the state when the second measurement is less than the threshold (2706).

With respect to the methods B, C, and D, the UE may compare the neighbor lists 816, 820 to determine whether to maintain C2K-LTE reselection state information. In one configuration, the comparison may be a bitwise comparison of the entire neighbor lists. In such a configuration, if the neighbor lists 816, 820 differ, all of the C2K-LTE reselection state information is reset. In another configuration, the UE determines whether a frequency associated with existing C2K-LTE reselection state information is indicated in the new neighbor list 820. If the frequency is indicated, the C2K-LTE reselection state information for that frequency may be maintained, and if the frequency is not indicated, the C2K-LTE reselection state information for that frequency may be reset. The UE may make the determination of whether to maintain or to reset the C2K-LTE reselection state information on other criterion(s). For example, a UE may reset the C2K-LTE reselection state information if a relative priority between a priority of the first network and a priority of the second network has changed between the neighbor list 816 and the second neighbor list 820, at least one parameter affecting a comparison between a signal strength of the frequency and a threshold has changed between the neighbor list 816 and the second neighbor list 820 (e.g., parameters for calculating S_EUTRA have changed), or the second neighbor list 820 includes a second frequency that has a higher priority than the frequency.

Of the aforementioned methods, method A is the simplest option. However, because the UE resets the state upon the idle HO, if an idle HO occurs repeatedly, reselection to the LTE network will be delayed. Method B allows for the state to be retained based on the new neighbor list. However, the delay of acting upon expiration of an EUTRAReselect timer and hence the delay for reselecting to the LTE network may be large if receipt of the new neighbor list is delayed. Method C does not delay acting upon expiration of an EUTRAReselect timer or reselecting to the LTE network. However, because the UE may reselect to an LTE cell and the carrier frequency of that LTE cell may not be indicated in the new neighbor list, the UE may end up reselecting to an LTE cell with too low a signal strength for effective communication. Method D allows for the state to be maintained only for a fixed duration and frequency idle HOs does not delay LTE reselection. However, the backoff timer states are lost if the new neighbor list differs from the old neighbor list. Further, the UE may incorrectly act on reselection events based on contents received from the old neighbor list.

Figure 28:
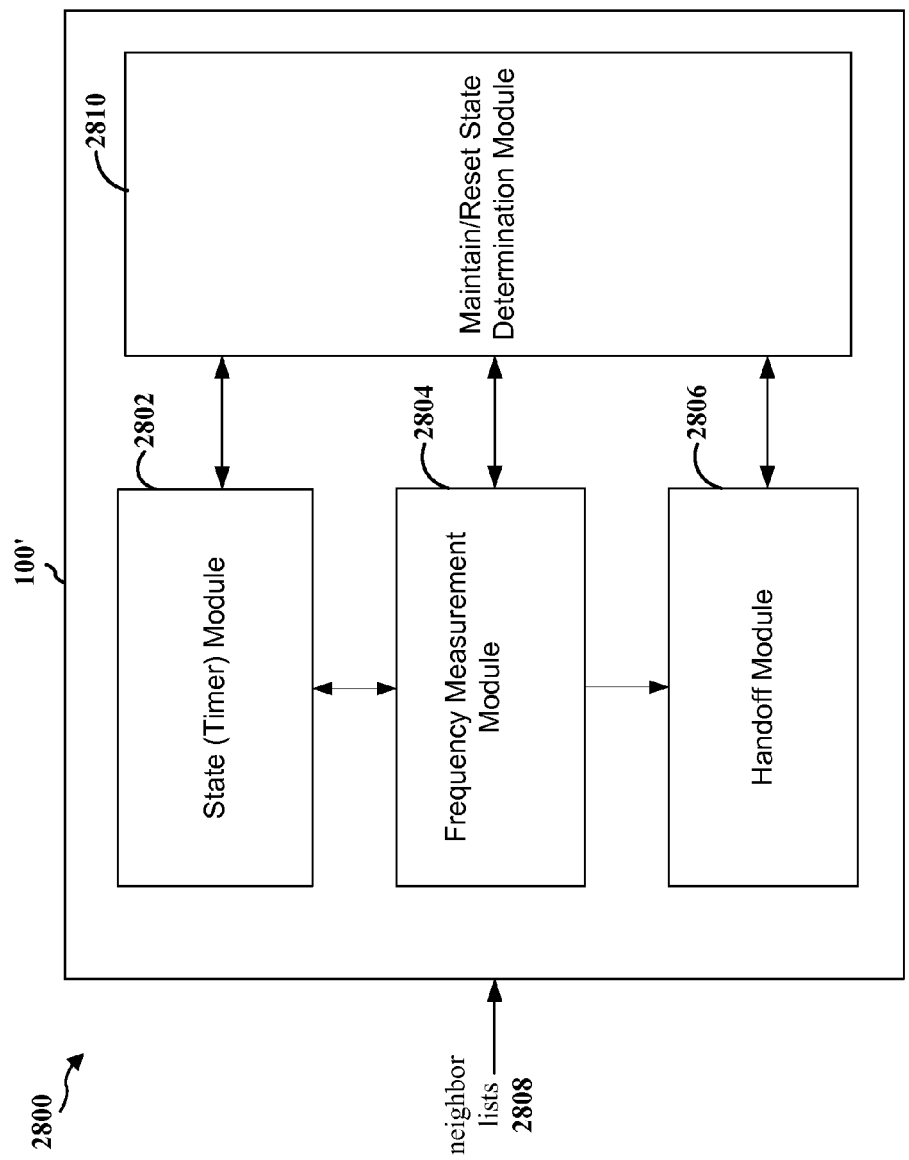
FIG. 28 is a conceptual block diagram illustrating the functionality of an exemplary apparatus.

FIG. 28 is a conceptual block diagram 2800 illustrating the functionality of an exemplary apparatus 100'. The apparatus 100' includes frequency measurement module 2804 that is configured to initiate a process for reselection from a first network to a second network by performing a measurement on a frequency indicated in a neighbor list 2808 received from a first cell in the first network. The neighbor list 2808 includes information indicating at least one frequency associated with the second network. The apparatus 100' further includes a state (timer) module 2802 that is configured to create a state associated with the frequency based on the measurement. The apparatus 100' further includes a handoff module 2806 that is configured to move from the first cell to a second cell in the first network. The apparatus 100' further includes a maintain/reset state determination module that is configured to determine whether to maintain the state upon the move from the first cell to the second cell.

In one configuration, the state (timer) module 2802 may be configured to create the state by starting a first timer when the measurement is greater than a threshold. An expiration of the first timer may be associated with performing a second measurement on the frequency. In one configuration, the state (timer) module 2802 may be configured to create the state by starting a second timer when the measurement is less than the threshold. An expiration of the second timer may be associated with re-performing the measurement on the frequency. In one configuration, the maintain/reset state determination module 2810 may be configured to reset the state upon the move from the first cell to the second cell. In one configuration, the maintain/reset state determination module 2810 may be configured to maintain the state upon the move from the first cell to the second cell until a second neighbor list is received from the second cell. In such a configuration, the handoff module 2806 may be configured to refrain from proceeding with the reselection based on the state until the second neighbor list is received. In one configuration, the frequency measurement module 2804 may be configured to receive the second neighbor list and to comparing the second neighbor list to the neighbor list. In such a configuration, the maintain/reset state determination module 2810 may be configured to determine whether to maintain the state upon the move from the first cell to the second cell based on the comparison.

In one configuration, the maintain/reset state determination module 2810 may be configured to maintain the state upon the move from the first cell to the second cell until a second neighbor list is received from the second cell. In such a configuration, the handoff module 2806 may be configured to proceed with the reselection based on the state until the second neighbor list is received. In one configuration, the frequency measurement module 2804 may be configured to receive the second neighbor list before the reselection and to compare the second neighbor list to the neighbor list. In such a configuration, the maintain/reset state determination module 2810 may be configured to determine whether to maintain the state upon the move from the first cell to the second cell based on the comparison.

In one configuration, the maintain/reset state determination module 2810 may be configured to maintain the state upon the move from the first cell to the second cell for a time period when an expiration of the state is less than or equal to the time period, and to reset the state upon the move from the first cell to the second cell when the expiration of the state is greater than the time period. In such a configuration, the handoff module 2806 may be configured to refrain from proceeding with the reselection based on the state until a second neighbor list is received from the second cell; the frequency measurement module 2804 may be configured to receive the second neighbor list from the second cell before the expiration of the state and to determine whether the frequency is indicated in the second neighbor list; and the maintain/reset state determination module 2810 may be configured to maintain the state when the frequency is indicated in the second neighbor list, and to maintain a portion of the state and reset a remaining portion of the state when the frequency is not indicated in second neighbor list. In one configuration, the frequency measurement module 2804 may be configured to perform a second measurement on the frequency upon expiration of the portion of the state, the handoff module 2806 may be configured to move to the second network when the second measurement is greater than a threshold, and the maintain/reset state determination module 2810 may be configured to reset the portion of the state when the second measurement is less than the threshold.

In one configuration, the frequency measurement module 2804 may be configured to receive a second neighbor list and to compare the second neighbor list to the neighbor list. In such a configuration, the maintain/reset state determination module 2810 may be configured to reset the state if the frequency is not indicated in the second neighbor list, a relative priority between a priority of the first network and a priority of the second network has changed between the neighbor list and the second neighbor list, at least one parameter affecting a comparison between a signal strength of the frequency and a threshold has changed between the neighbor list and the second neighbor list, the second neighbor list includes a second frequency that has a higher priority than the frequency, or the neighbor list and the second neighbor list do not match bitwise. In one configuration, the maintain/reset state determination module 2810 may be configured to reset a first portion of the state if the threshold has increased in the second neighbor list in comparison to the neighbor list, and to reset a second portion of the state if the threshold has decreased in the second neighbor list in comparison to the neighbor list. In one configuration, the frequency measurement module 2804 may be configured to store a measured value associated with the measurement on the frequency. In such a configuration, the maintain/reset state determination module 2810 may reset the first portion of the state if the threshold has increased in the second neighbor list in comparison to the neighbor list by more than the measured value, and reset the second portion of the state if the threshold has decreased in the second neighbor list in comparison to the neighbor list by more than the measured value. The apparatus 100' may include additional modules that perform each of the steps in the aforementioned flow charts. As such, each step in the aforementioned flow charts may be performed by a module and the apparatus 100' may include one or more of those modules.

In one configuration, the apparatus 100/100' for wireless communication includes means for initiating a process for reselection from a first network to a second network by performing a measurement on a frequency indicated in a neighbor list received from a first cell in the first network. The neighbor list includes information indicating at least one frequency associated with the second network. The apparatus further includes means for creating a state associated with the frequency based on the measurement. The apparatus further includes means for moving from the first cell to a second cell in the first network. The apparatus further includes means for determining whether to maintain the state upon the move from the first cell to the second cell.

In one configuration, the means for determining whether to maintain the state maintains the state upon the move from the first cell to the second cell until a second neighbor list is received from the second cell. In such a configuration, the apparatus further includes means for refraining from proceeding with the reselection based on the state until the second neighbor list is received. In one configuration, the apparatus further includes means for receiving the second neighbor list and means for comparing the second neighbor list to the neighbor list. In such a configuration, the means for determining whether to maintain the state upon the move from the first cell to the second cell makes the determination based on the comparison.

In one configuration, the means for determining whether to maintain the state maintains the state upon the move from the first cell to the second cell until a second neighbor list is received from the second cell. In such a configuration, the apparatus further includes means for proceeding with the reselection based on the state until the second neighbor list is received. In one configuration, the apparatus further includes means for receiving the second neighbor list before the reselection and means for comparing the second neighbor list to the neighbor list. In such a configuration, the means for determining whether to maintain the state upon the move from the first cell to the second cell makes the determination based on the comparison.

In one configuration, the means for determining whether to maintain the state is configured to maintain the state upon the move from the first cell to the second cell for a time period when an expiration of the state is less than or equal to the time period, and to reset the state upon the move from the first cell to the second cell when the expiration of the state is greater than the time period. In one configuration, the apparatus further includes means for refraining from proceeding with the reselection based on the state upon maintaining the state until a second neighbor list is received from the second cell, means for receiving the second neighbor list from the second cell before the expiration of the state, means for determining whether the frequency is indicated in the second neighbor list, means for maintaining the state when the frequency is indicated in the second neighbor list, and means for maintaining a portion of the state and resetting a remaining portion of the state when the frequency is not indicated in second neighbor list. In one configuration, the apparatus further includes means for performing a second measurement on the frequency upon expiration of the portion of the state, means for moving to the second network when the second measurement is greater than a threshold, and means for resetting the portion of the state when the second measurement is less than the threshold.

In one configuration, the apparatus further includes means for receiving a second neighbor list; means for comparing the second neighbor list to the neighbor list; and means for resetting the state if the frequency is not indicated in the second neighbor list, a relative priority between a priority of the first network and a priority of the second network has changed between the neighbor list and the second neighbor list, at least one parameter affecting a comparison between a signal strength of the frequency and a threshold has changed between the neighbor list and the second neighbor list, the second neighbor list includes a second frequency that has a higher priority than the frequency, or the neighbor list and the second neighbor list do not match bitwise. In one configuration, the apparatus further includes means for resetting a first portion of the state if the threshold has increased in the second neighbor list in comparison to the neighbor list, and means for resetting a second portion of the state if the threshold has decreased in the second neighbor list in comparison to the neighbor list. In one configuration, the apparatus further includes means for storing a measured value associated with the measurement on the frequency. In such a configuration, the means for resetting the first portion of the state resets the first portion of the state if the threshold has increased in the second neighbor list in comparison to the neighbor list by more than the measured value, and the means for resetting the second portion of the state resets the second portion of the state if the threshold has decreased in the second neighbor list in comparison to the neighbor list by more than the measured value. The aforementioned means may be one or more of the aforementioned modules of the apparatus 100' (see FIG. 28) and/or the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   initiating a process for reselection from a first network to a second network by performing a measurement on a frequency indicated in a neighbor list received from a first cell in the first network, wherein the frequency indicated in the neighbor list is associated with the second network, and wherein the second network operates according to a different radio access technology than the first network;
   creating a state associated with the frequency that is associated with the second network based on the measurement while staying connected to the first cell in the first network;
   moving from the first cell to a second cell in the first network; and
   determining whether to maintain the state upon the move from the first cell to the second cell.

2. The method of claim 1, wherein the creating the state comprises starting a first timer when the measurement is greater than a threshold, an expiration of the first timer being associated with performing a second measurement on the frequency.

3. The method of claim 2, wherein the creating the state further comprises starting a second timer when the measurement is less than the threshold, an expiration of the second timer being associated with re-performing said measurement on the frequency.

4. The method of claim 1, wherein the determining whether to maintain the state comprises resetting the state upon the move from the first cell to the second cell.

5. The method of claim 1, wherein the determining whether to maintain the state comprises maintaining the state upon the move from the first cell to the second cell until a second neighbor list is received from the second cell, and the method further comprises refraining from proceeding with the reselection based on the state until the second neighbor list is received.

6. The method of claim 5, further comprising:
   receiving the second neighbor list; and
   comparing the second neighbor list to said neighbor list, wherein the determining whether to maintain the state upon the move from the first cell to the second cell is based on the comparison.

7. The method of claim 1, wherein the determining whether to maintain the state comprises maintaining the state upon the move from the first cell to the second cell until a second neighbor list is received from the second cell, and the method further comprises proceeding with the reselection based on the state until the second neighbor list is received.

8. The method of claim 7, further comprising:
   receiving the second neighbor list before the reselection; and
   comparing the second neighbor list to said neighbor list, wherein the determining whether to maintain the state upon the move from the first cell to the second cell is based on the comparison.

9. The method of claim 1, wherein the determining whether to maintain the state comprises:
   maintaining the state upon the move from the first cell to the second cell for a time period when an expiration of the state is less than or equal to the time period; and
   resetting the state upon the move from the first cell to the second cell when the expiration of the state is greater than the time period.

10. The method of claim 9, wherein upon maintaining the state, the method further comprises:
    refraining from proceeding with the reselection based on the state until a second neighbor list is received from the second cell;
    receiving the second neighbor list from the second cell before the expiration of the state; and
    determining whether the frequency is indicated in the second neighbor list;
    maintaining the state when the frequency is indicated in the second neighbor list; and
    maintaining a portion of the state and resetting a remaining portion of the state when the frequency is not indicated in second neighbor list.

11. The method of claim 10, further comprising:
    performing a second measurement on the frequency upon expiration of the portion of the state;
    moving to the second network when the second measurement is greater than a threshold; and
    resetting the portion of the state when the second measurement is less than the threshold.

12. The method of claim 1, further comprising:
    receiving a second neighbor list;
    comparing the second neighbor list to the neighbor list; and
    resetting the state if said frequency is not indicated in the second neighbor list, a relative priority between a priority of the first network and a priority of the second network has changed between the neighbor list and the second neighbor list, at least one parameter affecting a comparison between a signal strength of the frequency and a threshold has changed between the neighbor list and the second neighbor list, the second neighbor list includes a second frequency that has a higher priority than said frequency, or the neighbor list and the second neighbor list do not match bitwise.

13. The method of claim 12, further comprising:
    resetting a first portion of the state if the threshold has increased in the second neighbor list in comparison to the neighbor list; and
    resetting a second portion of the state if the threshold has decreased in the second neighbor list in comparison to the neighbor list.

14. The method of claim 13, further comprising storing a measured value associated with the measurement on the frequency, wherein the resetting the first portion of the state occurs if the threshold has increased in the second neighbor list in comparison to the neighbor list by more than the measured value, and the resetting the second portion of the state occurs if the threshold has decreased in the second neighbor list in comparison to the neighbor list by more than the measured value.

15. An apparatus for wireless communication, comprising:
means for initiating a process for reselection from a first network to a second network by performing a measurement on a frequency indicated in a neighbor list received from a first cell in the first network, wherein the frequency indicated in the neighbor list is associated with the second network, and wherein the second network operates according to a different radio access technology than the first network;
means for creating a state associated with the frequency that is associated with the second network based on the measurement while staying connected to the first cell in the first network;
means for moving from the first cell to a second cell in the first network; and
means for determining whether to maintain the state upon the move from the first cell to the second cell.

16. The apparatus of claim 15, wherein the means for creating the state starts a first timer when the measurement is greater than a threshold, an expiration of the first timer being associated with performing a second measurement on the frequency.

17. The apparatus of claim 16, wherein the means for creating the state starts a second timer when the measurement is less than the threshold, an expiration of the second timer being associated with re-performing said measurement on the frequency.

18. The apparatus of claim 15, wherein the means for determining whether to maintain the state resets the state upon the move from the first cell to the second cell.

19. The apparatus of claim 15, wherein the means for determining whether to maintain the state maintains the state upon the move from the first cell to the second cell until a second neighbor list is received from the second cell, and the apparatus further comprises means for refraining from proceeding with the reselection based on the state until the second neighbor list is received.

20. The apparatus of claim 19, further comprising:
means for receiving the second neighbor list; and
means for comparing the second neighbor list to said neighbor list,
wherein the means for determining whether to maintain the state upon the move from the first cell to the second cell makes the determination based on the comparison.

21. The apparatus of claim 15, wherein the means for determining whether to maintain the state maintains the state upon the move from the first cell to the second cell until a second neighbor list is received from the second cell, and the apparatus further comprises means for proceeding with the reselection based on the state until the second neighbor list is received.

22. The apparatus of claim 21, further comprising:
means for receiving the second neighbor list before the reselection; and
means for comparing the second neighbor list to said neighbor list,
wherein the means for determining whether to maintain the state upon the move from the first cell to the second cell makes the determination based on the comparison.

23. The apparatus of claim 15, wherein the means for determining whether to maintain the state is configured to:
maintain the state upon the move from the first cell to the second cell for a time period when an expiration of the state is less than or equal to the time period; and
reset the state upon the move from the first cell to the second cell when the expiration of the state is greater than the time period.

24. The apparatus of claim 23, further comprising:
means for refraining from proceeding with the reselection based on the state upon maintaining the state until a second neighbor list is received from the second cell;
means for receiving the second neighbor list from the second cell before the expiration of the state; and
means for determining whether the frequency is indicated in the second neighbor list;
means for maintaining the state when the frequency is indicated in the second neighbor list; and
means for maintaining a portion of the state and resetting a remaining portion of the state when the frequency is not indicated in second neighbor list.

25. The apparatus of claim 24, further comprising:
means for performing a second measurement on the frequency upon expiration of the portion of the state;
means for moving to the second network when the second measurement is greater than a threshold; and
means for resetting the portion of the state when the second measurement is less than the threshold.

26. The apparatus of claim 15, further comprising:
means for receiving a second neighbor list;
means for comparing the second neighbor list to the neighbor list; and
means for resetting the state if said frequency is not indicated in the second neighbor list, a relative priority between a priority of the first network and a priority of the second network has changed between the neighbor list and the second neighbor list, at least one parameter affecting a comparison between a signal strength of the frequency and a threshold has changed between the neighbor list and the second neighbor list, the second neighbor list includes a second frequency that has a higher priority than said frequency, or the neighbor list and the second neighbor list do not match bitwise.

27. The apparatus of claim 26, further comprising:
means for resetting a first portion of the state if the threshold has increased in the second neighbor list in comparison to the neighbor list; and
means for resetting a second portion of the state if the threshold has decreased in the second neighbor list in comparison to the neighbor list.

28. The apparatus of claim 27, further comprising means for storing a measured value associated with the measurement on the frequency, wherein the means for resetting the first portion of the state resets the first portion of the state if the threshold has increased in the second neighbor list in comparison to the neighbor list by more than the measured value, and the means for resetting the second portion of the state resets the second portion of the state if the threshold has decreased in the second neighbor list in comparison to the neighbor list by more than the measured value.

29. An apparatus for wireless communication, comprising:
a processing system configured to:
initiate a process for reselection from a first network to a second network by performing a measurement on a frequency indicated in a neighbor list received from a first cell in the first network, wherein the frequency indicated in the neighbor list is associated with the second network, and wherein the second network operates according to a different radio access technology than the first network;

create a state associated with the frequency that is associated with the second network based on the measurement while staying connected to the first cell in the first network;

move from the first cell to a second cell in the first network; and determine whether to maintain the state upon the move from the first cell to the second cell.

30. The apparatus of claim 29, wherein to create the state, the processing system is configured to start a first timer when the measurement is greater than a threshold, an expiration of the first timer being associated with performing a second measurement on the frequency.

31. The apparatus of claim 30, wherein to create the state, the processing system is configured to start a second timer when the measurement is less than the threshold, an expiration of the second timer being associated with re-performing said measurement on the frequency.

32. The apparatus of claim 29, wherein the processing system is configured to determine whether to maintain the state by resetting the state upon the move from the first cell to the second cell.

33. The apparatus of claim 29, wherein the processing system is configured to determine whether to maintain the state by maintaining the state upon the move from the first cell to the second cell until a second neighbor list is received from the second cell, and the processing system is further configured to refrain from proceeding with the reselection based on the state until the second neighbor list is received.

34. The apparatus of claim 33, wherein the processing system is further configured to:

receive the second neighbor list; and compare the second neighbor list to said neighbor list, wherein the processing system is configured to determine whether to maintain the state upon the move from the first cell to the second cell based on the comparison.

35. The apparatus of claim 29, wherein the processing system is configured to determine whether to maintain the state by maintaining the state upon the move from the first cell to the second cell until a second neighbor list is received from the second cell, and the processing system is configured to proceed with the reselection based on the state until the second neighbor list is received.

36. The apparatus of claim 35, wherein the processing system is further configured to:

receive the second neighbor list before the reselection; and compare the second neighbor list to said neighbor list, wherein the processing system is configured to determine whether to maintain the state upon the move from the first cell to the second cell based on the comparison.

37. The apparatus of claim 29, wherein the processing system is configured to determine whether to maintain the state by:

maintaining the state upon the move from the first cell to the second cell for a time period when an expiration of the state is less than or equal to the time period; and resetting the state upon the move from the first cell to the second cell when the expiration of the state is greater than the time period.

38. The apparatus of claim 37, wherein upon maintaining the state, the processing system is configured to:

refrain from proceeding with the reselection based on the state until a second neighbor list is received from the second cell;

receive the second neighbor list from the second cell before the expiration of the state; and determine whether the frequency is indicated in the second neighbor list;

maintain the state when the frequency is indicated in the second neighbor list; and maintain a portion of the state and resetting a remaining portion of the state when the frequency is not indicated in second neighbor list.

39. The apparatus of claim 38, wherein the processing system is further configured to:

perform a second measurement on the frequency upon expiration of the portion of the state;

move to the second network when the second measurement is greater than a threshold; and reset the portion of the state when the second measurement is less than the threshold.

40. The apparatus of claim 29, wherein the processing system is further configured to:

receive a second neighbor list;

compare the second neighbor list to the neighbor list; and reset the state if said frequency is not indicated in the second neighbor list, a relative priority between a priority of the first network and a priority of the second network has changed between the neighbor list and the second neighbor list, at least one parameter affecting a comparison between a signal strength of the frequency and a threshold has changed between the neighbor list and the second neighbor list, the second neighbor list includes a second frequency that has a higher priority than said frequency, or the neighbor list and the second neighbor list do not match bitwise.

41. The apparatus of claim 40, wherein the processing system is further configured to:

reset a first portion of the state if the threshold has increased in the second neighbor list in comparison to the neighbor list; and reset a second portion of the state if the threshold has decreased in the second neighbor list in comparison to the neighbor list.

42. The apparatus of claim 41, wherein the processing system is further configured to store a measured value associated with the measurement on the frequency, wherein the processing system is configured to reset the first portion of the state if the threshold has increased in the second neighbor list in comparison to the neighbor list by more than the measured value, and to reset the second portion of the state if the threshold has decreased in the second neighbor list in comparison to the neighbor list by more than the measured value.

43. A computer program product, comprising:

a non-transitory computer-readable medium comprising code for:

initiating a process for reselection from a first network to a second network by performing a measurement on a frequency indicated in a neighbor list received from a first cell in the first network, wherein the frequency indicated in the neighbor list is associated with the second network, and wherein the second network operates according to a different radio access technology than the first network;

creating a state associated with the frequency that is associated with the second network based on the measurement while staying connected to the first cell in the first network;

moving from the first cell to a second cell in the first network; and determining whether to maintain the state upon the move from the first cell to the second cell.

44. The computer program product of claim 43, wherein the code for creating the state starts a first timer when the measurement is greater than a threshold, an expiration of the first timer being associated with performing a second measurement on the frequency.

45. The computer program product of claim 44, wherein the code for creating the state starts a second timer when the measurement is less than the threshold, an expiration of the second timer being associated with re-performing said measurement on the frequency.

46. The computer program product of claim 43, wherein the code for determining whether to maintain the state resets the state upon the move from the first cell to the second cell.

47. The computer program product of claim 43, wherein the code for determining whether to maintain the state maintains the state upon the move from the first cell to the second cell until a second neighbor list is received from the second cell, and the non-transitory computer-readable medium further comprises code for refraining from proceeding with the reselection based on the state until the second neighbor list is received.

48. The computer program product of claim 47, wherein the non-transitory computer-readable medium further comprises code for:
receiving the second neighbor list; and
comparing the second neighbor list to said neighbor list, wherein the code for determining whether to maintain the state upon the move from the first cell to the second cell makes the determination based on the comparison.

49. The computer program product of claim 43, wherein the code for determining whether to maintain the state maintains the state upon the move from the first cell to the second cell until a second neighbor list is received from the second cell, and the non-transitory computer-readable medium further comprises code for proceeding with the reselection based on the state until the second neighbor list is received.

50. The computer program product of claim 49, wherein the non-transitory computer-readable medium further comprises code for:
receiving the second neighbor list before the reselection; and
comparing the second neighbor list to said neighbor list, wherein the code for determining whether to maintain the state upon the move from the first cell to the second cell makes the determination based on the comparison.

51. The computer program product of claim 43, wherein the code for determining whether to maintain the state:
maintains the state upon the move from the first cell to the second cell for a time period when an expiration of the state is less than or equal to the time period; and
resets the state upon the move from the first cell to the second cell when the expiration of the state is greater than the time period.

52. The computer program product of claim 51, wherein the non-transitory computer-readable medium further comprises code for:
refraining from proceeding with the reselection based on the state upon maintaining the state until a second neighbor list is received from the second cell;
receiving the second neighbor list from the second cell before the expiration of the state; and
determining whether the frequency is indicated in the second neighbor list;
maintaining the state when the frequency is indicated in the second neighbor list; and
maintaining a portion of the state and resetting a remaining portion of the state when the frequency is not indicated in second neighbor list.

53. The computer program product of claim 52, wherein the non-transitory computer-readable medium further comprises code for:
performing a second measurement on the frequency upon expiration of the portion of the state;
moving to the second network when the second measurement is greater than a threshold; and
resetting the portion of the state when the second measurement is less than the threshold.

54. The computer program product of claim 43, wherein the non-transitory computer-readable medium further comprises code for:
receiving a second neighbor list;
comparing the second neighbor list to the neighbor list; and
resetting the state if said frequency is not indicated in the second neighbor list, a relative priority between a priority of the first network and a priority of the second network has changed between the neighbor list and the second neighbor list, at least one parameter affecting a comparison between a signal strength of the frequency and a threshold has changed between the neighbor list and the second neighbor list, the second neighbor list includes a second frequency that has a higher priority than said frequency, or the neighbor list and the second neighbor list do not match bitwise.

55. The computer program product of claim 54, wherein the non-transitory computer-readable medium further comprises code for:
resetting a first portion of the state if the threshold has increased in the second neighbor list in comparison to the neighbor list; and
resetting a second portion of the state if the threshold has decreased in the second neighbor list in comparison to the neighbor list.

56. The computer program product of claim 55, wherein the non-transitory computer-readable medium further comprises code for storing a measured value associated with the measurement on the frequency, wherein the code for resetting the first portion of the state resets the first portion of the state if the threshold has increased in the second neighbor list in comparison to the neighbor list by more than the measured value, and the code for resetting the second portion of the state resets the second portion of the state if the threshold has decreased in the second neighbor list in comparison to the neighbor list by more than the measured value.

* * * * *